US011847588B2

United States Patent
Ha et al.

(10) Patent No.: US 11,847,588 B2
(45) Date of Patent: Dec. 19, 2023

(54) METHOD AND APPARATUS FOR MANAGING A MOVING OBJECT FOR FLEET SYSTEM

(71) Applicants: Hyundai Motor Company, Seoul (KR); Kia Motors Corporation, Seoul (KR)

(72) Inventors: Jae Jun Ha, Gyeonggi-do (KR); Young Jun Moon, Sejong (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/095,999

(22) Filed: Nov. 12, 2020

(65) Prior Publication Data

US 2021/0150424 A1 May 20, 2021

(30) Foreign Application Priority Data

Nov. 14, 2019 (KR) .................. 10-2019-0145929

(51) Int. Cl.
*G06Q 10/02* (2012.01)
*G06Q 10/0631* (2023.01)

(52) U.S. Cl.
CPC ......... *G06Q 10/02* (2013.01); *G06Q 10/0631* (2013.01)

(58) Field of Classification Search
CPC ........ G08G 1/0968; G08G 1/00; G01C 21/34; G06Q 50/30; G06Q 10/02; G06Q 10/0631; B60W 60/00
See application file for complete search history.

(56) References Cited

U.S. PATENT DOCUMENTS

| | | | |
|---|---|---|---|
| 8,825,264 B2* | 9/2014 | Montemerlo | G01S 17/86 701/25 |
| 2016/0189435 A1* | 6/2016 | Beaurepaire | G08G 1/202 705/13 |
| 2017/0180491 A1* | 6/2017 | Ishikawa | G08G 5/0043 |
| 2018/0317067 A1* | 11/2018 | Ameixieira | H04W 4/50 |
| 2018/0321688 A1* | 11/2018 | Chase | G05D 1/0022 |

(Continued)

OTHER PUBLICATIONS

Aishwarya Rathore, State-of-the-Art Self Driving Cars: Comprehensive Review, International Journal of Conceptions on Computing and Information Technology, vol. 4, Issue 1, Jan. 2016, pp. 1-5 (Year: 2016).*

*Primary Examiner* — Rupangini Singh
(74) *Attorney, Agent, or Firm* — Fox Rothschild LLP

(57) ABSTRACT

A method of managing a moving object in a fleet system includes: transmitting, by a user device, a moving object request message including a departure point and use time information to a server; receiving, by the user device, a list of available moving objects based on the moving object request message from the server: selecting, by the user device, a moving object from the list of available moving objects; transmitting, by the user device, reservation information based on the moving object selection information and the use time information to the server; and allocating the moving object to the user device based on the reservation information. The server may update allocation and placement information of a plurality of moving objects based on reservation information of a plurality of user devices.

12 Claims, 15 Drawing Sheets

(56) References Cited

U.S. PATENT DOCUMENTS

| | | | | |
|---|---|---|---|---|
| 2018/0338298 | A1* | 11/2018 | Pan | H04W 48/18 |
| 2019/0064814 | A1* | 2/2019 | Pandit | G08G 1/202 |
| 2020/0039534 | A1* | 2/2020 | Dipietro, Pietro | B60W 50/087 |
| 2020/0326194 | A1* | 10/2020 | Wang | G01C 21/3492 |
| 2020/0380631 | A1* | 12/2020 | Svitak | G06Q 20/0855 |

* cited by examiner

METHOD AND APPARATUS FOR MANAGING A MOVING OBJECT FOR FLEET SYSTEM

CROSS REFERENCE TO RELATED APPLICATION

The present application claims under 35 U.S.C. § 119(a) the benefit of Korean Patent Application No. 10-2019-0145929, filed Nov. 14, 2019, the entire contents of which are incorporated by reference herein.

BACKGROUND

(a) Technical Field

The present disclosure relates to a method and apparatus for managing a moving object sharing service through a fleet system, more particularly, to a method and apparatus for controlling a moving object through the fleet system.

(b) Description of the Related Art

Along with technical advances, the notion of car ownership is weakening, while the use of shared cars is on the rise. Particularly, although the need for shared vehicles through car sharing or car pool services has increased, existing shared vehicles do not reflect preferences of individual users yet. Accordingly, a personalized system for each user may be required.

In addition, for the convenience of life in a particular region or residence, the need for shared vehicles and related services is increasing. However, as the services of shared vehicles are not viewed as highly as private vehicles and vehicle sharing systems have not fully developed, vehicle security and related services are difficult to provide. Hereinafter, in view of the background described above, a vehicle fleet system will be provided.

SUMMARY

The present disclosure provides a method and apparatus for managing a moving object sharing service through a fleet system.

The present disclosure provides a method and apparatus for controlling a moving object for the fleet system.

The present disclosure provides a method of supervising the moving object for the fleet system.

The present disclosure relates to a method and apparatus for managing a moving object in a fleet system. The embodiments described below may be commonly applied to a method and apparatus for managing a moving object in a fleet system according to the present disclosure.

A method of managing a moving object in a fleet system according to the present disclosure may include: transmitting, by a user device, a moving object request message including a departure point and use time information to a server; receiving, by the user device, a list of available moving objects based on the moving object request message from the server: selecting, by the user device, a moving object from the list of available moving objects; transmitting, by the user device, reservation information based on moving object selection information and the use time information to the server; and allocating the moving object to the user device based on the reservation information. The server may update allocation and placement information of a plurality of moving objects based on reservation information of a plurality of user devices.

In some forms of the present disclosure, a destination point along with the departure point may be set based on a designated spot, and the designated spot may be a place that is predetermined by the server.

In some forms of the present disclosure, a plurality of designated spots may be predetermined in the server, and an available moving object may be managed in each of the designated spots.

In some forms of the present disclosure, the server may manage the available moving object by considering at least one of the number of parking spaces at each of the designated spots or the number of available moving objects at each of the designated spots.

In some forms of the present disclosure, the server may transmit information on a designated spot recommended for departure different from the spot of the departure point to the user device when there is no moving object available in the spot of the departure point.

In some forms of the present disclosure, the server may transmit a recommended route or a recommended means of transport to the designated spot recommended for departure to the user device when the server transmits information on the designated spot recommended for departure.

In some forms of the present disclosure, the server may transmit information on a designated spot recommended for destination different from the spot of the destination point to the user device when there is no parking space available in the spot of the destination point.

In some forms of the present disclosure, the server may transmit a recommended route or a recommended means of transport from the recommended designated destination spot to the spot of the destination point to the user device when the server transmits information on a recommended designated destination spot.

In some forms of the present disclosure, the server may move a moving object of a spot different from the spot of the departure point to the spot of the departure point in a driverless manner when the number of available moving objects in a spot of the departure point is equal to or less than a predetermined value.

In some forms of the present disclosure, the server may move a moving object of a spot different from the spot of the destination point to the spot of the destination point in a driverless manner when the number of available parking spaces in a spot of the destination point is equal to or greater than a predetermined value.

In some forms of the present disclosure, the server may increase the number of available moving objects of the second designated spot at the first point of time when the departure point is a first designated spot, the destination point is a second designated spot and an end time of use based on the use time information is a first time point.

In some forms of the present disclosure, the moving object request message, which is transmitted to the server by the user device, includes usage type information of the moving object. The use type information of the moving object may be one of routine driving or exceptional driving.

In some forms of the present disclosure, the server may allocate a moving object by prioritizing the reservation information of a user device indicated by the routine driving over the reservation information of a user device indicated by the exceptional driving when the server updates the allocation and placement information of the plurality of moving objects based on the reservation information of the plurality of user devices.

In some forms of the present disclosure, the use time information may include at least one of the use start time information or the use end time information of a moving object selected by the user device.

In some forms of the present disclosure, the server may update the allocation and placement of the plurality of moving objects by using the reservation information that is received before a predetermined time based on the use start time information.

In some forms of the present disclosure, the server may check information of a extra moving object when the server receives the reservation information after a predetermined time based on the use start time information. When the extra moving object is present, the server may allocate the moving object based on the reservation information.

In some forms of the present disclosure, the moving object may periodically transmit a message including the location information and status information of the moving object to the server.

In some forms of the present disclosure, the moving object may transmit the message to the server based on a first period when the moving object is used based on the user device. When the moving object is not used, the moving object may transmit the message to the server based on a second period. The first period may be shorter than the second period.

In some forms of the present disclosure, the server may determine whether or not the moving object violates a sharing criterion based on the message transmitted by the moving object. When the server determines that the moving has violated the sharing criterion, the server may transmit a warning message to the moving object.

In some forms of the present disclosure, the server may change a control right for the moving object when the server does not receive a response to the warning message or the violation of the sharing criterion is not released within a predetermined time.

In some forms of the present disclosure, the sharing criterion may be set as at least one of a criterion based on a use time of the moving object, a criterion based on a use area of the moving object, or a status of the moving object.

In some forms of the present disclosure, an available time for sharing the moving object may be set in the moving object, and the moving object in the available status may be allocated to the user device by the server based on the available time.

In some forms of the present disclosure, the available time may be set by considering an inspection time of the moving object.

In some forms of the present disclosure, the server may confirm the updated allocation and placement information of the moving object and may move the moving object in a driverless manner on the basis of the location of a moving object, which is set as unavailable, and the updated allocation and position information of the moving object.

In some forms of the present disclosure, the server may group the plurality of moving objects under management by a certain number and may perform maintenance and management for each moving object in each group of the moving objects.

In some forms of the present disclosure, the server may allocate a support unit for the maintenance and management of moving objects in each of the moving object group.

In a fleet system according to the present disclosure, an apparatus for managing a moving object may be a server that manages a moving object in a fleet system.

A fleet system for managing a moving object according to the present disclosure may include a transceiver for transmitting and receiving a signal and a processor for controlling the transceiver. The processor may receive a moving object request message including a departure point and a use time information from a user device, transmit information on a list of available moving objects based on the moving object request message to the user device, receive reservation information based on information on a selected moving object and information on a use time from the user device, and allocate the moving object to the user device based on the reservation information. The fleet system may update allocation and placement information on a plurality of moving objects based on reservation information on a plurality of user devices.

According to the present disclosure, a fleet system for providing a moving object sharing service may include a managing device configured to manage the fleet system, a multiplicity of user devices registered in the fleet system and a plurality of moving objects registered in the fleet system. At least one user device among the plurality of user devices may transmit a moving object request message including a departure point and use time information to the server, receive information on a list of available moving objects based on the moving object request message from the server, select a moving object from the information on the list of available moving objects, and transmit reservation information based on information on the selected moving object and information on the use time to the server. Based on the reservation information, the managing device may allocate the moving object to the user device and, based on the reservation information of the plurality of user devices, may update allocation and placement information on the plurality of moving objects.

DETAILED DESCRIPTION OF THE DISCLOSURE

Figure 1:
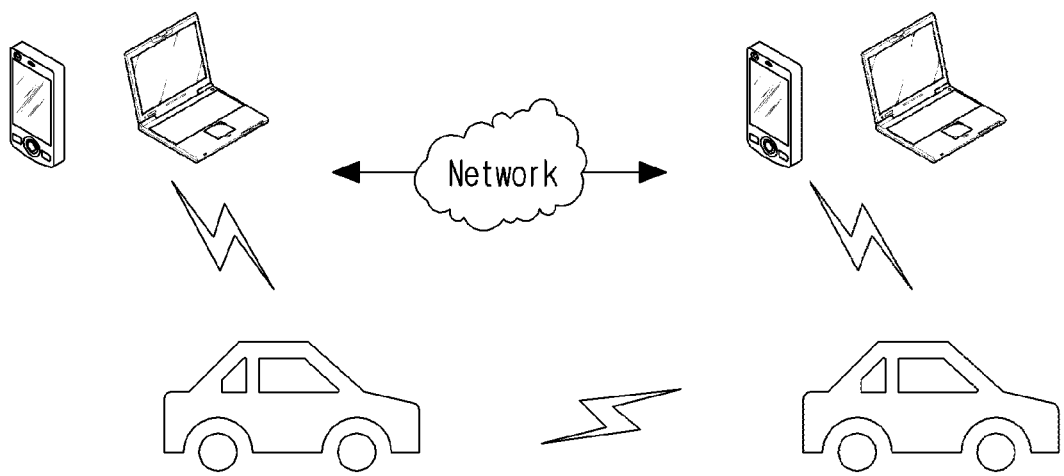
FIG. 1 is a view illustrating a method in which a moving object communicates with another apparatus through a network, in accordance with an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, embodiments of the present disclosure will be described in detail so that those skilled in the art can easily carry out the present disclosure referring to the accompanying drawings. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "connected", "coupled", or "connected" to another component, it is understood that not only a direct connection relationship but also an indirect connection relationship through an intermediate component may also be included.

In the present disclosure, the terms such as first and second are used only for the purpose of distinguishing one component from another, and do not limit the order or importance of components, etc. unless specifically status otherwise. Accordingly, within the scope of this disclosure, a first component in one embodiment may be referred to as a second component in another embodiment, and similarly a second component in one embodiment may be referred to as a first component in another embodiment.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included in the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, embodiments that include other components in addition to the components described in the various embodiments are also included in the scope of the present disclosure.

Advantages and features of the present disclosure, and methods for achieving them will be apparent with reference to the embodiments described below in detail with reference to the accompanying drawings. However, the present disclosure is not limited to the embodiments set forth below, but may be implemented in various forms, and the present embodiments are provided to make the disclosure of the present disclosure complete and to fully inform those of ordinary skill in the art of the scope of the present disclosure.

FIG. 1 is a view illustrating a method in which a moving object communicates with other moving object or device through a network. Referring to FIG. 1, a moving object may communicate with other moving object(s) or other device(s). Herein, as exemplary embodiments, the moving object may communicate with other moving object(s) or other device(s) based on cellular communication, WAVE communication, dedicated short range communication (DSRC), or other communication schemes. That is, as a cellular communication network, a communication network such as LTE, 5G, WiFi communication network, WAVE communication network, etc. may be used. In addition, a local area network used in a moving object, such as DSRC may be used, and the present disclosure is not limited to the above-described embodiment.

In addition, for example, for the purpose of security of the moving object with respect to communication of a moving object, a module capable of communicating only with a device inside the moving object and a module capable of communicating with a device outside the moving object may exist separately. For example, inside a moving object, communication based on the security may be performed for only a device within a certain range in the moving object, such as Wi-Fi communication. For example, the moving object and a personal device owned by the moving object driver may include a communication module for performing only communication with each other. That is, the moving object and the personal device of the moving object driver may use a communication network blocked from an external communication network. Also, as an exemplary embodiment, the moving object may include a communication module for performing communication with an external device. In addition, for example, the above-described module may be implemented as a single module. In other words, based on a single module, a moving object may communicate with other device, which is not limited to the above-described embodiment. That is, in a moving object, communication may be embodied based on various methods and is not limited to the above-described embodiment.

Herein, as an exemplary embodiment, a moving object may refer to a device capable of moving. For example, a moving object may be a vehicle (including an autonomous vehicle or an automated vehicle), a drone, a mobility, a mobile office, a mobile hotel or a personal air vehicle (PAV). In addition, a moving object may be another type of moving apparatus and is not limited to the above-described examples.

Figure 2:
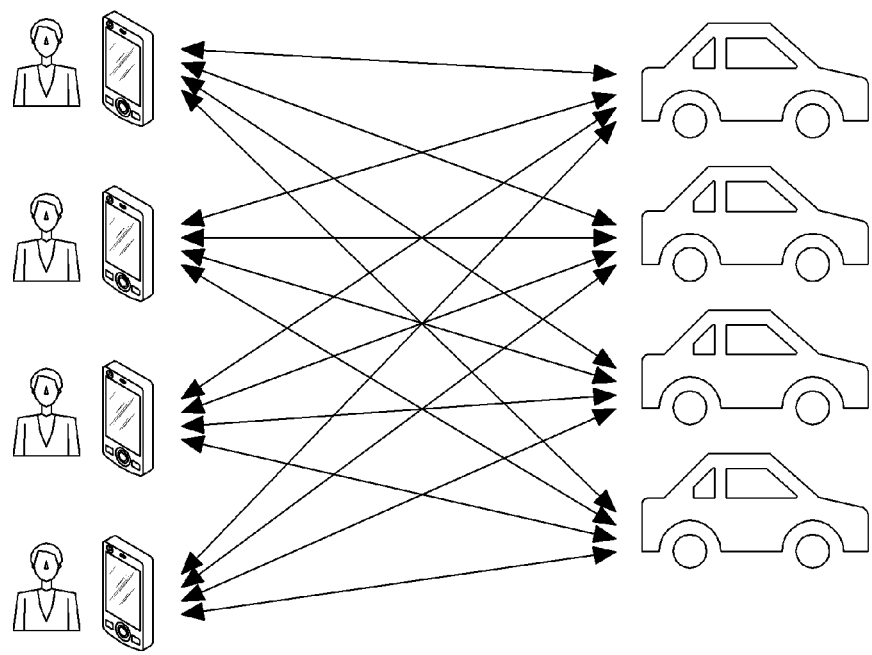
FIG. 2 is a view illustrating a method of sharing a moving object based on a fleet system in accordance with an embodiment of the present disclosure.

In addition, FIG. 2 illustrates a method of providing a moving object sharing service based on a fleet system.

For example, a fleet system may be applied to provide the moving object sharing service. Herein, the fleet system may be a system including a plurality of devices and a plurality of moving objects. In addition, for example, a fleet system may further include a road side unit (RSU) and so on. Herein, a device may be a smart phone, a smart pad and a smart watch. As another example, a device may be an apparatus capable of performing other communication and exchanging a signal, which is not limited to the above-described embodiment. However, for the convenience of explanation, a device is referred to in the description below. In addition, for example, a moving object may be a vehicle. In addition, as one exemplary embodiment, a moving object may be an object moving on rails or other constructed areas. As another exemplary embodiment, a moving object may be a flying object like a drone. That is, a moving object may refer to an object capable of moving and be a shared moving object based on a fleet system. For the convenience of explanation, a moving object will refer to a vehicle in the description below. This may be applied to other moving objects in the same way. As another example, a road side unit (RSU) may be a roadside apparatus capable of communication. In addition, for example, a RSU may refer to a structure installed for transmitting and receiving a signal to and from a building or another area, which is not limited to the above-described embodiment. However, for the convenience of explanation, such structures will be referred to as RSUs in the description below. RSUs may be various structures or apparatuses, which are not limited to the above-described embodiment.

In addition, a fleet system may be a moving object sharing system. A fleet system may be a system in which a moving object is shared in a certain area. Herein, the certain area may be a local concept, such as an apartment complex, a working place, and the like. For example, the certain area may include an area inside the apartment complex and an area spaced a predetermined distance from the apartment complex. As another example, the certain area may mean an area spaced a predetermined distance from the work place. As another example, the area to which the fleet system is applied may be a larger area or a city unit in terms of an administrative area, and some forms of the present disclosure are not limited thereto. That is, the certain area may mean a reference range capable of being operated through the fleet system, and may be changed by the user or the system. In addition, as an exemplary embodiment, the fleet system may be a system in which a moving object is shared with a user authenticated as a specific user (or device). For example, a specific user may be an apartment resident who may be provided with the fleet system service. For example, the fleet system may provide a moving object sharing service based on devices registered by apartment residents. This allows the sharing service to be provided only to the specific user, thereby increasing vehicle security and manageability. However, the specific user who uses the moving objects shared in the fleet system may be determined according to different methods, and some forms of the present disclosure are not limited thereto. The moving object sharing fleet system may be provided with shared moving objects. Herein, the shared moving object may be a moving object authenticated and authorized to be shared by the system. For example, the shared moving object may be a moving object registered in the fleet system. Herein, a fleet system manager may supply shared moving objects with the fleet system. That is, only moving objects authenticated or authorized by the fleet system manager may be used as the shared moving objects. This enables preventing accidents caused by security or management of the shared moving objects in the fleet system. In particular, the fleet system may have the shared moving objects registered. A right to register a moving object as the shared moving objects in the fleet system may be limited by the fleet system. Herein, the moving objects capable of being registered in the fleet system may have the same ID or the same identification information to each other. In addition, the fleet system provides the shared moving objects while managing the same. For example, the management of the shared moving objects may provide shared moving object service, such as residual oil information, vehicle status information, or vehicle driving information for a moving object registered in the fleet system. Herein, the fleet system may check the status of the shared moving object in real time, and in the case of a moving object in which a failure occurs, the fleet system may limit an authority for use thereof or transmit a repair command therefor through the system, thereby providing the service in such a manner.

As another example, the fleet system may provide a shared moving object, as well as a private moving object owned by an owner. For example, the fleet system may set up identification information for distinguishing shared moving objects provided by the system from privately owned moving objects. Herein, a privately owned moving object indication field may be provided. When the privately owned moving object indication field is 0, it may indicate that the shared moving object is a moving object provided by the system provider without private ownership. Meanwhile, when the privately owned moving object indication field is 1, it may indicate that the moving object is privately owned and provided as a shared moving object to the fleet system, which is shown in Table 1 below. That is, the case where the privately owned moving objects and the shared moving objects provided by the system are mixed based on the above description may also be considered. Herein, as an exemplary embodiment, the service provided by the fleet system may be varied according to the moving object type indication field. For example, in the case of a moving object provided by the fleet system, there may be no usage limit for a user who uses the moving object. Meanwhile, the usage limit may exist in the case of a privately shared moving object. As another example, the fleet system moving object and the privately shared moving object may provide the service on the basis of billing systems different from each other, and some forms of the present disclosure are not limited thereto.

TABLE 1

| Vehicle type indication field | Indicated information |
| --- | --- |
| 0 | Moving object provided by fleet system |
| 1 | Privately shared moving object |

As another example, in relation to a specific operation of the fleet system, the service may be provided based on a device registered in the fleet system.

In particular, the device registered in the fleet system may obtain shared moving object information after the authentication and security procedures for the system. That is, the shared moving object information may be provided to the device. Herein, the device may contact the moving object that is to be used based on the information on the shared moving object.

For example, there may be moving objects or devices (or users) registered in the fleet system. In other words, based on authentication and authorization, only specific moving objects and devices may be registered in the fleet system. Here, the fleet system may be operated based on status information of the registered moving object and device. For example, the fleet system may check information about a moving object currently being used and location information about an individual moving object in real time. Herein, for example, each moving object may periodically transmit its information to the fleet system. In addition, for example, each moving object may transmit its information to the fleet system on the basis of an event trigger. For example, when an event of a change in location or use of a moving object is triggered, the moving object may transmit its information to the fleet system (or server). The server may be a kind of managing device that manages the fleet system. In the following description, the server may be configured and operated as the managing device in some cases. In addition, the fleet system (or server) may check the information on the registered device in real time. Herein, as an exemplary embodiment, the registered device may not always use the service of the fleet system. Therefore, activation information indicating whether the registered device uses the service of the fleet system may be needed. Herein, as an exemplary embodiment, the fleet system may include list information about registered devices. Among registered devices included in the list of fleet system, a device that is currently using a moving object or activates the system for use of a moving object may be provided along with the list information. As another example, the devices may be classified into a registered device (deactivated device) that does not use the fleet system, a registered device (activated device) that is using a moving object of the fleet system, and a registered device (temporary device) that is to use a moving object. That is, it is possible to provide information on whether a device is actually in use, whether there is a use intention of a device, and whether a device is not used yet even with a use intention. In addition, as an exemplary embodiment, usage status information may be further indicated for a device using a moving object of the fleet system. For example, the usage status information may further include use estimated time information, use location information, or the like.

In particular, the fleet system may include list information on a plurality of moving objects and a plurality of devices that are registered. Herein, the list information may include at least one of usage status information, device location information, or moving object location information. Herein, the fleet system may provide the moving object sharing service based on the device location information and the moving object location information. In addition, the above-described usage status information may include at least one of information on a moving object in use, estimated time information on a moving object in use, device-moving object matching information, deactivated device information, activated device information, deactivated moving object information, or activated moving object information. Herein, as an exemplary embodiment, the usage status information may further include information on moving object in use that is being used by other device and estimated time information on the moving object in use. In addition, the usage status information may further include device-moving object matching information based on the list form information. In addition, the usage status information may include activated device information and deactivated device information. For example, as described above, the activated device information may be a device that is currently using the moving object or preparing to use the moving object among devices registered in the fleet system. For example, the activated device may mean a device that executes a program or an application for the fleet system. Meanwhile, the deactivated device may be a device that is registered in the fleet system but does not use moving object sharing. For example, the deactivated device may be a device that does not execute or deactivates a program or application for the fleet system.

In addition, the fleet system may include activated moving object information and deactivated moving object information. In this case, as an exemplary embodiment, the fleet system may include status information on a plurality of moving objects. In this case, the status information on the moving object may be information on the moving object, such as information on whether there is a moving object abnormality, information on remaining distance to drive, or information on a time of refueling. That is, the moving object status information may be information for determining whether the moving object may be provided for moving object sharing, and some forms of the present disclosure are not limited thereto. Herein, the fleet system may determine whether to activate the moving object based on the above status information. For example, when a moving object has no abnormal condition and a sufficient amount of fuel, the fleet system may classify the moving object into an activated moving object. On the other hand, when a moving object has an abnormal moving object condition, the fleet system may classify the moving object into a deactivated moving object. Herein, the fleet system may provide information on the deactivated moving object to an associated system or server. For example, the associated system or server may perform repair or management on a deactivated moving object, and some forms of the present disclosure are not limited thereto.

In addition, as an exemplary embodiment, when a moving object has an amount of fuel below a predetermined level, the fleet system may classify the moving object into a deactivated moving object, as described above. As another example, when a moving object having an amount of fuel below a predetermined level is shared through a device, the fleet system may notify the device user of information about the amount of fuel. In addition, as an exemplary embodiment, the fleet system may provide a user with information on an associated specific system (e.g., a gas station of a specific brand), in which information indicating that refueling is required may be provided. Herein, the fleet system may exchange information on the billing or other necessary information with the associated specific system regardless of the user, thereby providing the service in such a manner.

That is, a user using the moving object sharing system may refuel the moving object at a designated place without paying a fee, and the fee may be processed through the system associated with the fleet system. Meanwhile, for example, as described above, a device (temporary device) intending to use a moving object may use a moving object by checking a fleet system.

For example, the device may be assigned a moving object that is to be used through a fleet system. Herein, for example, the fleet system (or server) may assign the moving object to the device by using at least one of information on the moving object in use, location information of the moving object, or location information of the device. Meanwhile, as an exemplary embodiment, when the fleet system does not allocate the moving object, the fleet system may provide the device with information on the failure. In addition, as an exemplary embodiment, the fleet system may allocate only the moving object within a predetermined distance with respect to the location of the device, and the present disclosure is not limited thereto. Next, the device may approach the moving object within a predetermined distance. Herein, the device may transmit an authentication signal to the moving object. In addition, as an exemplary embodiment, the device may use the shared moving object by tagging the shared moving object based on a list of available shared moving objects. For example, the device may tag a moving object through NFC, Bluetooth, or a magnetic such as a traffic card. Herein, when the device tags the shared moving object, the shared moving object may perform an authentication procedure through the fleet system so that the device may provide the moving object. For example, when the authentication is completed based on the device tagging, the door of the moving object may be opened.

With respect to an exemplary operation for authentication, when the device approaches the moving object within a predetermined distance, an authentication signal may be transmitted to the moving object. Herein, the communication available by the moving object and the device may be Bluetooth, NFC, or magnetic card as described above. That is, a procedure for authentication may be performed under certain conditions, and the present disclosure is not limited thereto. When the device approaches or tags the moving object, the moving object and the device may exchange signal so that the device may be authenticated by determining whether the device may use the moving object. Herein, the device may transmit, to the moving object, an authentication signal including its own identification information and identification information of a group in which the device is included. Herein, the moving object may check whether the device is a device registered in the fleet system based on the identification information of the device included in the received authentication signal. In addition, the moving object may check whether the device is included in a group capable of providing the service based on the identification information of the group included in the authentication signal. That is, the moving object may determine whether the device may use the moving object based on the device identification information and the group identification information. For example, when the device does not use the moving object, the moving object may transmit information on the unavailability to the device. For example, the device may obtain the information on the unavailability from an application or another service providing program.

Meanwhile, when the device may use the moving object, the moving object may transmit a signal for authentication procedure execution request to the device. That is, when the device is suitably registered in the above-described fleet system (or server), and the moving object may also suitably operate on the basis of the fleet system, the moving object performs the signal for authentication procedure execution request to the device. Herein, the moving object may also transmit moving object identification information and encryption key information included in the authentication procedure execution request signal to the device. For example, both the moving object identification information and the device information may be registered in the fleet system. Herein, the moving object may transmit a signal including the moving object identification information, the device identification information, and the encryption key information to the fleet system.

In addition, the device may also transmit, to the fleet system, the signal including the moving object identification information, the encryption key information, and device identification information included in the signal for authentication procedure execution request.

Next, the fleet system may compare signal information received from the moving object with signal information received from the device. Herein, when the moving object identification information, the device identification information, and the encryption key information all match, the fleet system may recognize that the device may use the moving object. Thereafter, the fleet system may transmit authentication confirmation information to the moving object and the device. Herein, the fleet system may register information indicating that the device uses the moving object, in a database. In addition, as an exemplary embodiment, the time for which the device uses the moving object and additional information may be continuously transmitted.

In addition, the moving object may register the device based on the authentication confirmation information and is allowed to open the door. In addition, a lock may be released to use the moving object, whereby the device may control the moving object.

Herein, for example, when the above-described authentication is completed, the moving object and the device may periodically exchange signals. That is, while the device uses the moving object, the moving object may periodically exchange signals with the device, thereby continuously confirming the usage thereof.

Figure 3:
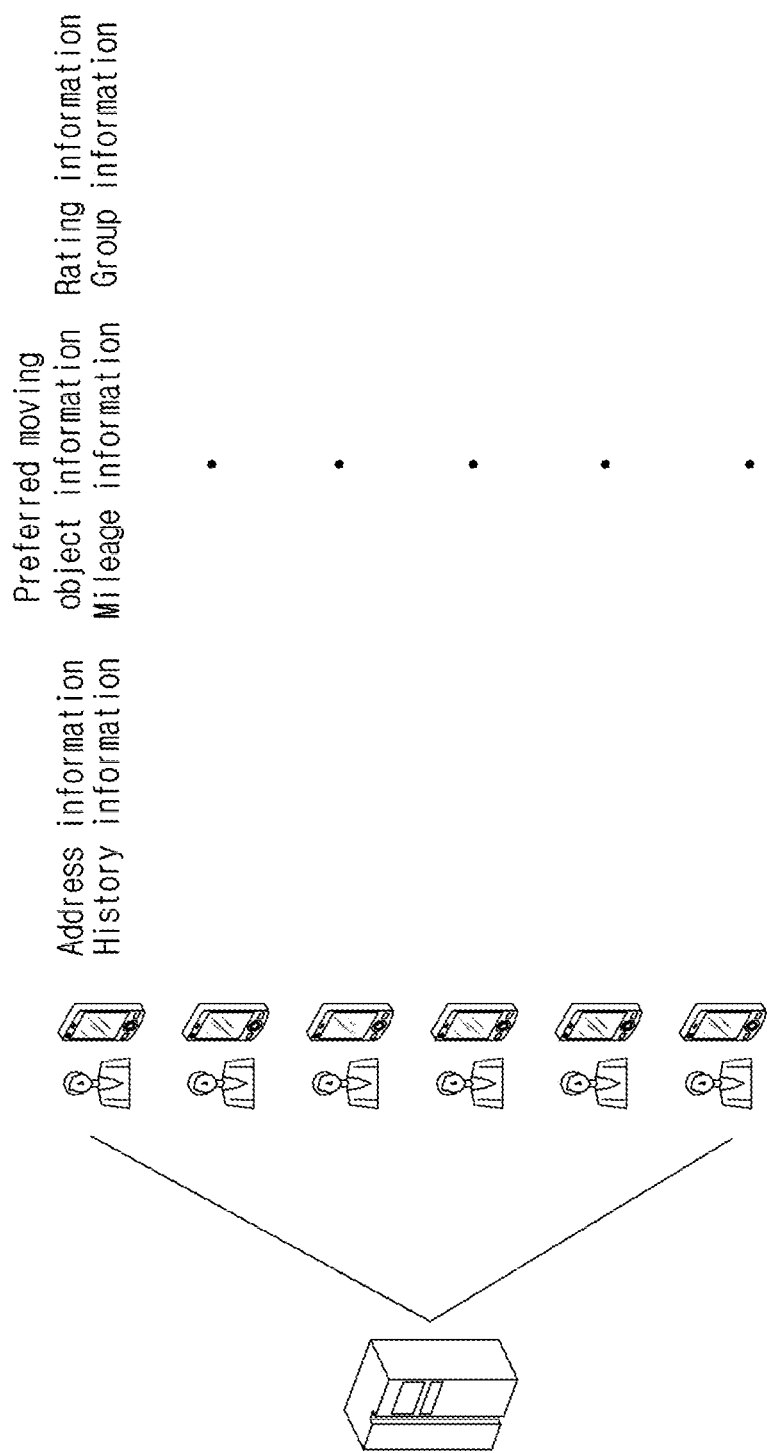
FIG. 3 is a view illustrating a method of managing a user based on a fleet system in accordance with an embodiment of the present disclosure.

FIG. 3 is a view illustrating a method of managing a user based on a fleet system in accordance with an embodiment of the present disclosure.

For example, based on the above-description, a moving object and a device may be managed in a fleet system. Herein, for example, information on each user may be managed in a fleet system. For example, information on each user may be information on the usage of a user based on user identification. For a more concrete example, information of each user may include at least one of address information of a user, usage history information of a user, preferred moving object information, mileage information, rating information, or group information. For example, the address information of a user may be information for identifying the user's main route while using a fleet system. For example, the address information of a user may be address information set by the user such as home address or office address. In addition, as an exemplary embodiment, a fleet system may store a usage history of a user. For example, a fleet system may perform recommendation for the use of a moving object based on moving vehicle history information of a user. In addition, as an exemplary embodiment, a fleet system may perform management for placing and allocating moving objects by utilizing moving vehicle history information of a plurality of users, which will be described below. In addition, as an exemplary embodiment, a fleet system may include information on a user's preferred moving object. For example, information on a user's preferred moving object may consider the frequency or preference of a moving object in use. In addition, as an exemplary embodiment, information on a user's preferred moving object may be information input by the user, which is not limited to the above-described embodiment.

In addition, as an exemplary embodiment, a fleet system may manage mileage information of a user. Herein, the mileage information may be a value given based on the user's usage of a moving object. Thus, a fleet system may give the user priority or penalty, which will be described below.

In addition, as an exemplary embodiment, a fleet system may provide rating information of a user. For example, the rating information of the user may be determined based on a frequency with which the user uses a moving object or the usage status information of the moving object. For example, when the user frequently uses the moving object, the rating may be raised. In addition, as an exemplary embodiment, when the user uses the moving object cleanly or without accident, the rating may be raised. In addition, as an exemplary embodiment, a fleet system may manage information on a user group. For example, information on a user group may group users using moving objects based on address information or main travel routes. In addition, as an exemplary embodiment, users may group themselves based on a fleet system and may use a moving object allocated from the fleet system based on the grouping information.

That is, a fleet system may match a moving object to a user based on various information related to the user. In addition, a fleet system may manage a user based on user-related information, which will be described in detail below.

Figure 4:
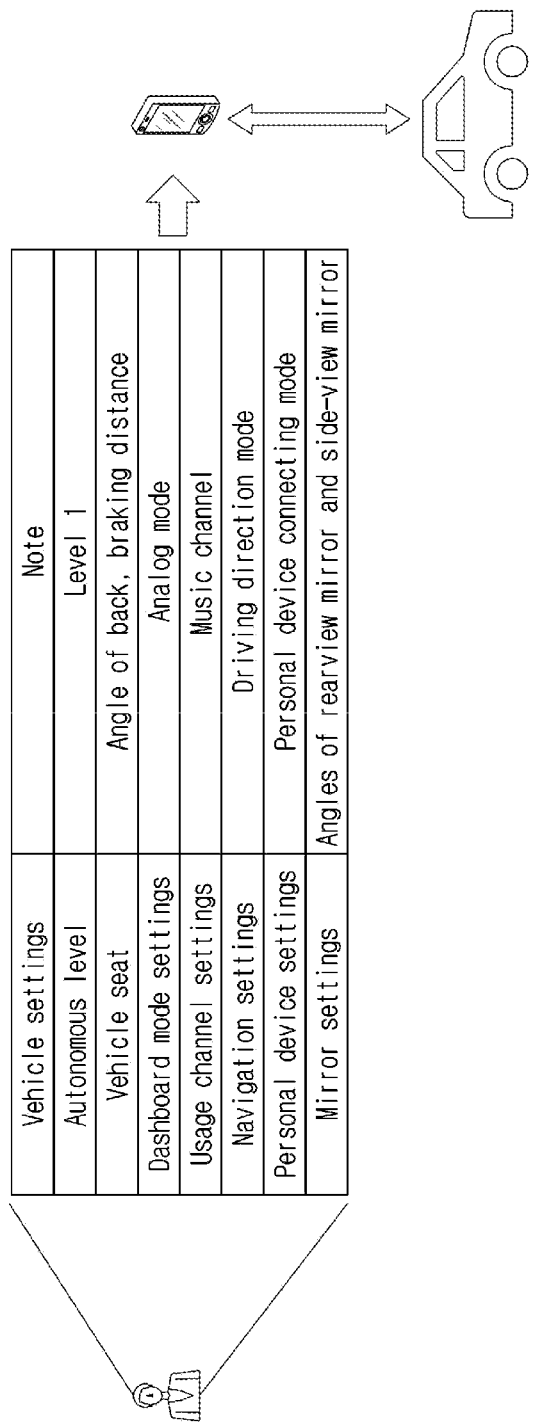
FIG. 4 is a view illustrating a method of providing a service based on a fleet system.

In addition, as an exemplary embodiment, referring to FIG. 4, a device may provide information on personal style or user information to a moving object. For example, a device may include, as personal style information, autonomous driving level information, moving object seats, dashboard mode settings, channels, navigation settings, personal device settings and mirror settings. However, this is merely one example, and the present disclosure is not limited to the above-described embodiment. That is, the moving object provided by the fleet system may be in the form of communicating with a personal device having a personal driving style stored in a learned manner. Thus, the running performance and driving environment of the moving object may be converted in such a manner as to be customized to the user, and then provided to the user. As described above with reference to FIG. 4, the information may be converted into a form customized to a user and then provided. In particular, according to the driving characteristic set in the personal device, it is possible to provide various driving environments, such as a position and height of a driver's seat, a color and brightness of an interior light, a position and angle of room mirror and side-view mirror, a temperature control (air conditioner and heater) range in vehicle, an angle of a steering wheel, a tire pressure, a driving mode (normal, eco, power mode, etc.), a wireless communication connection mode (WAVE, cellular, etc.), an autonomous driving function setting variable range (speed and interval, lane change lateral speed, acceleration and deceleration, etc.), and the like. Herein, for example, the fleet system may improve user convenience and accident prevention efficiency for a shared vehicle by changing the vehicle setting based on the above information. Specifically, the setting for vehicle driving may be varied for each user, and when each user uses a vehicle that does not match his/her own setting, an accident may occur due to inexperienced driving or the like. Therefore, the risk of an accident may be increased when the shared vehicle is used. In consideration of the foregoing, when the fleet system provides the sharing service through the shared vehicle, the vehicle setting may be varied through the above-described information based on the user's personal style.

Herein, as an exemplary embodiment, a moving object may be designed so that the setting may be changed base on the above-described information. As another example, in the case of a moving object provided by a fleet system among shared moving objects, it is possible to perform the setting change in consideration of personal style as described above. Meanwhile, when the personal moving object is shared, the above-described change may be limited by reason of moving object security and design reason, and the present disclosure is not limited thereto. That is, in the case of providing a shared vehicle through the fleet system, the fleet system may differently set levels of security and design changes for the vehicle on the basis of the shared vehicle information, thereby increase user convenience. That is, the device may set the information about the vehicle driving. Herein, each user may preset vehicle usage information in consideration of his driving habits or driving patterns. Herein, when the user uses the shared vehicle, an accident risk or a moving object operation mistake may be caused by using a vehicle that is not familiar to the user. In consideration of this, the device may include setting information with respect to the device in the case of using the shared vehicle.

Herein, as an exemplary embodiment, the device may check a list of shared moving objects provided and select the shared moving object from among the list. Herein, when the device is adjacent to or in contact with the shared moving objects, the shared moving objects may be used with respect to the device. Herein, the shared moving object setting or other related settings are changed with respect to the device so that the device user may use the shared moving object. Herein, the moving object setting information reflects the user's preference or style, so that not only security and authentication related settings but also contents may be changed. For example, a form displayed on the shared moving object may be changed based on the interface set in the device, whereby the shared moving object may be operated based on the form.

That is, as described above, when the device approaches the shared moving object, the shared moving object may be changed and used with respect to the device.

Figure 5:
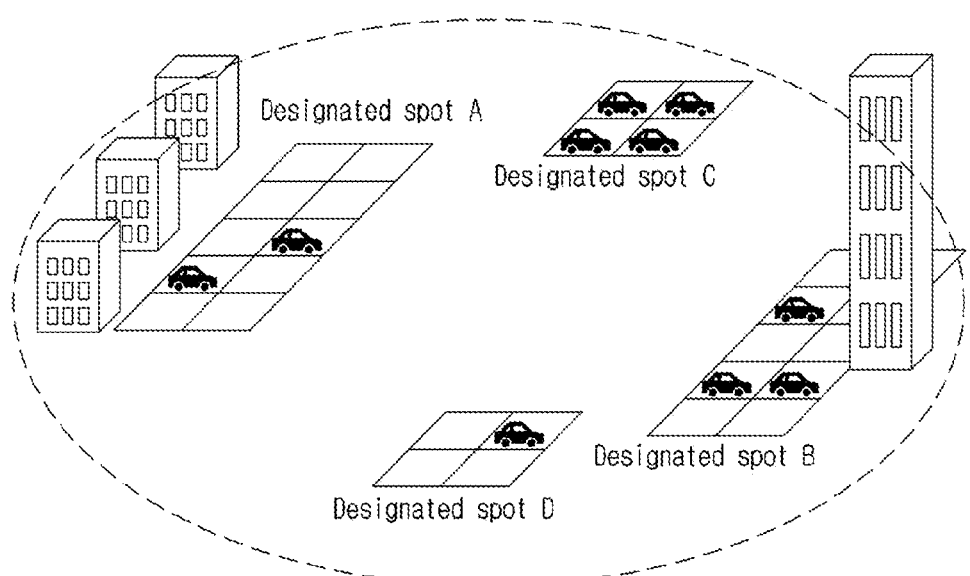
FIG. 5 is a view illustrating a method in which a moving object is managed based on a designated spot in a fleet system, in accordance with an embodiment of the present disclosure.

FIG. 5 is a view illustrating a method in which a moving object is managed based on a designated spot in a fleet system, in accordance with an embodiment of the present disclosure.

Based on a fleet system, a user may use a shared moving object. Specifically, a fleet system may enable a user, to whom a moving object is allocated through a device as described above, to use the moving object. Herein, as an exemplary embodiment, the use of the moving object may start and end only in a specific place. For example, when a user uses a moving object based on a fleet system, the user may start using the moving object only in a designated spot. In addition, as an exemplary embodiment, the user may end the use of the moving object in service only in a designated spot, that is, in a specific place. For a more concrete example, a fleet system may share a moving object at a user's request. Herein, the fleet system may provide the user with information of a designated spot and information on a moving object available therein. Herein, the user may select a moving object located in a designated spot nearest to his/her location and use the moving object thus selected. In addition, the user may end the use of the moving object in a designated spot nearest to a destination. For example, a fleet system may obtain information on a designated spot, where a user starts using a moving object, and information on a designated spot, where the user ends the use of the moving object, through the user's device. Herein, when there is no problem in a designated start spot and a designated end spot based on information obtained from the user, the fleet system may transmit, to the user's device, a message indicating whether or not a moving object is permitted. Next, the user may use a specific moving object by performing authentication for the moving object in a designated spot through the user's device, as described above.

Herein, as an exemplary embodiment, in the case of a fleet system, as a plurality of moving objects may be used by a plurality of users, a designated spot may be necessary. In other words, when a moving object is neglected by a user or a moving object is located in an area where a next user is unable to use it, the efficient operation of a fleet system may be difficult. In consideration of the foregoing description, a fleet system may manage and operate a moving object by means of a designated spot. In addition, as an exemplary embodiment, a designated spot may have a facility where a moving object may be refueled or charged. In addition, as an exemplary embodiment, a designated spot may have a facility where a moving object may have its facility tested. The present disclosure is not limited to the above-described embodiment. In addition, as an exemplary embodiment, a designated spot may be set and managed by a fleet system. For example, a designated spot may be an area equipped with parking space for each moving object, thereby managing the moving object.

For example, referring to FIG. 5, a user living near the designated spot A may request the use of a moving object located in the designated spot A to a fleet system through the user device. Herein, the user needs to determine not only a designated departure spot but also a designated destination spot. For example, the user's designated destination spot may be the designated spot B. For example, the fleet system may confirm a moving object available in the designated departure spot and a parking space available in the designated destination spot and then may transmit information on the availability of the moving object to the user device. Herein, the user may travel from the designated spot A to the designated spot B by using the moving object that is authenticated through the user device.

As another example, a user's designated departure spot may be the same as the user's designated destination spot. That is, the user may start the use of a moving object in a designated spot and end the use of the moving object in the same designated spot. For example, the user may start the use of a moving object in the designated spot A and may end the use in the designated spot A. Herein, as an exemplary embodiment, a fleet system may obtain information on the usage time of a user from the user device in the above-described case. Herein, the fleet system may determine whether or not to permit the use of a moving object by considering usage time information and may transmit determined information to the user device. For example, a user may freely use a moving object for a specific time that is authenticated through the user device. The freedom of using the moving object may be guaranteed only by coming back to a corresponding designated spot at a usage return time.

As another example, a fleet system may manage moving objects by considering at least one of the number of moving objects moored at each spot or the maximum number (parking space) of moving objects moored at each spot. As an exemplary embodiment, when there is no available moving object in a designated departure spot or there is no parking space for a moving object in a designated destination spot, a fleet system may inform a user, through the user device, that the fleet system is not available. As another example, when there is no available moving object in a designated start spot, a fleet system may recommend another designated departure spot, where an available moving object exists, to a user through the user device. Herein, the designated departure spot thus recommended may be a spot that is at a short distance from the original designated departure spot, which the user initially wanted to select, or is easily accessible by public transportation. As another example, when there is no parking space for a moving object in a designated destination spot, a fleet system may recommend another designated destination spot. Herein, the designated destination spot thus recommended may be a spot that is at a short distance from the original designated destination spot, which the user initially wanted to select, or is easily accessible by public transportation from the initially selected designated destination spot. In other words, when it is not possible for a user to use a designated departure spot or a designated destination spot that the user wants, a fleet system may introduce a designated spot recommended for departure or a designated spot recommended for destination, thereby helping the user use a moving object in such a recommended designated spot. When a user uses a moving object by using the designated spot recommended for departure, a fleet system may inform the user of a recommended route, a recommended means of transportation and the like from the location of the user to the designated spot recommended for departure. In addition, when a user uses a moving object by using the designated spot recommended for destination, a fleet system may inform the user of a recommended route, a recommended means of transportation and the like from the designated spot recommended for destination to an initially selected designated destination spot.

For example, in FIG. 5, when a user selects the spot A as a designated departure spot and the spot C with no available parking space as a designated destination spot, the above-described problem may occur. Herein, apart from the designated spot C selected by the user, the fleet system may introduce the designated spot B or D, where a parking space is secured, as a designated spot recommended for destination.

As another example, when it is not possible for a user to use a designated departure or destination spot that is initially intended, a fleet system may provide the user with mileage by considering a distance between a recommend designated spot and a designated departure or destination spot. For example, as a distance increases between a user's intended designated departure or destination spot and a recommend designated spot, a fleet system may provide the user more mileage. As another example, a moving object provided by a fleet system may support autonomous driving or unmanned (or driverless) travel between spots. In this case, the fleet system may move a moving object from a specific spot to another specific spot by considering the number of available moving objects and the number of available parking spaces for each spot.

Based on moving objects reservations of users in a fleet system, the fleet system may move a moving object between spots in an unmanned (or driverless) manner. As an exemplary embodiment, when a particular user selects a spot with no available moving object as a designated departure spot, a fleet system may move a moving object of a spot with available moving objects to the designated departure spot selected by the user in an unmanned manner. Herein, the fleet system may move the available moving object to the designated departure spot selected by the user in an unmanned manner by considering a distance between the location of the user making a reservation and the designated departure spot, estimated time of arrival and the like. As another example, when a particular user selects a spot with no available parking space as a designated destination spot, a fleet system may move a moving object of the designated destination spot selected by the user to a spot with an available parking space in an unmanned manner. Herein, the fleet system may move the moving object of the spot with no available parking space to the spot with an available parking space in an unmanned manner by considering a distance between the designated departure spot and the designated destination spot, a required travel time and the like.

As another example, a fleet system may move a moving object from a particular spot to another particular spot by considering hourly demands of moving objects, even when there is no user's request of reservation. For example, in case a particular designated spot is selected as a designated departure spot in a particular time zone with high frequency, a fleet system may move many moving objects to the spot during the time zone in an unmanned manner. Herein, the moving objects moved in an unmanned manner may exist either in a spot that is selected as a designated departure spot during the time zone with lower frequency or in another spot that selected as a designated destination spot during the time zone with high frequency.

As another example, a moving object provided by a fleet system may not support unmanned travel. However, a manager device for managing the spot-to-spot travel of a moving object may be used for the management of a fleet system. Herein, the fleet system may provide a message, saying that the moving object should be moved from a particular spot to another particular spot, to the manager device by considering the hourly demands of moving objects. As the message that the fleet system may give to the manager device is based on the same moving object management depending on the unmanned movement system described above, further detailed description will be omitted.

Hereinafter, a concrete method where a fleet system disperses or concentrates moving objects will be described again in detail.

That is, as described above, in a fleet system, whether or not to use a moving object may be determined based on a designated spot, and there may be various forms of use.

Figure 6:
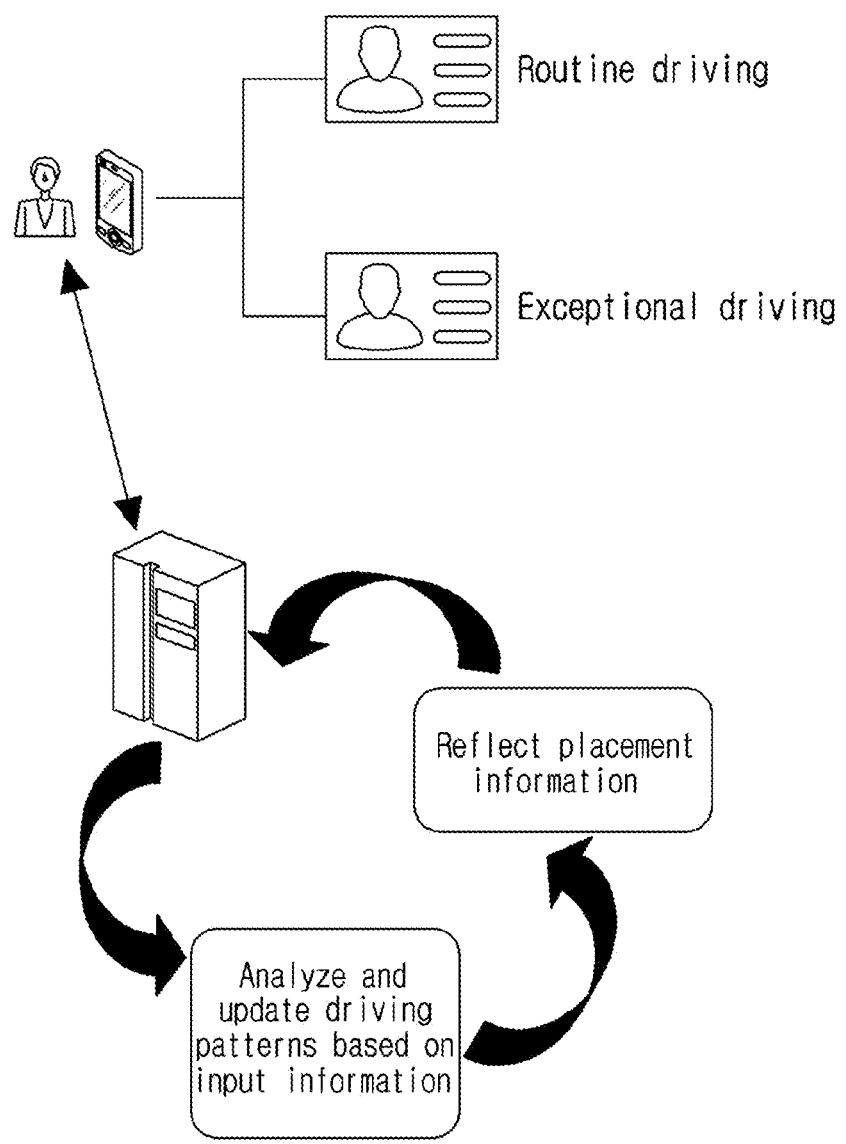
FIG. 6 is a view illustrating a method in which a moving object is shared based on a user in a fleet system, in accordance with an embodiment of the present disclosure.

FIG. 6 is a view illustrating a method in which a moving object is shared based on a user in a fleet system, in accordance with an embodiment of the present disclosure.

In addition, as an exemplary embodiment, a fleet system may provide a plurality of users with a plurality of moving objects and have the plurality of moving objects be shared. Accordingly, the fleet system may require information on moving object use and each user so that the plurality of moving object may be efficiently used by the plurality of users. Herein, as an exemplary embodiment, in consideration of the foregoing description, the fleet system may manage routine driving information and exceptional driving information for each user. For example, routine driving information may be information that a user periodically uses a moving object. For example, when a user uses a moving object during the commuting time every day, the above-described information may be managed as routine driving information in a fleet system. Herein, as an exemplary embodiment, the routine driving information may include information on a usage start location where the user starts using a moving object, information on an usage end location where the user ends the use of the moving object, and information on use time. In other words, the fleet system may obtain information that a user uses a moving object on constant cycle based on a certain routine. Herein, the fleet system may reflect placement information based on routine driving information for a plurality of users and may provide the placement information as input information of machine learning. That is, the routine driving information may be input information for machine learning. Herein, the fleet system may generate a schedule for placing and using a moving object based on the above-described information and may also provide moving object sharing information based on the generated schedule. In addition, as an exemplary embodiment, a fleet system may obtain information on exceptional driving for each user. Herein, for example, information on exceptional driving may be information regarding a case in which a user irregularly uses a moving object. Herein, as an exemplary embodiment, the fleet system may obtain information on exceptional driving together with information on use time and days of use. In other words, a user may provide the fleet system with information on exceptional driving together with information on use time and days of use. In addition, as an exemplary embodiment, information on exceptional driving may be provided to the fleet system before a moving object is used, and the present disclosure is not limited to the above-described embodiment.

Herein, as an exemplary embodiment, a fleet system may reflect exceptional driving information when using a moving object that is scheduled based on routine driving information. For example, the exceptional driving information may enable a moving object to be allocated without hindering the use of the moving object that is used based on routine driving information. In other words, the fleet system may prefer the routine driving information to the exceptional driving information and may perform scheduling for a moving object by additionally reflecting the exceptional driving information.

As another example, the use type information of the above-described moving object may further include emergency driving. Emergency driving may mean a case in which the moving object is used for emergency. For example, when a user needs to urgently visit an emergency room by using the moving object, the above-described information may be managed as emergency driving information in a fleet system. As an exemplary embodiment, the emergency driving information may include information on a start location in which the user starts using a moving object, information on an end location in which the user ends the use of the moving object, and information on use time. However, as emergency driving is a special case, unlike routine driving information, only information on the use start location and the use start for the moving object may be included. As another example, in consideration of emergency driving as a special case, a fleet system may determine whether or not the use of a moving object is based on emergency driving by considering the use time and destination of a user based on machine learning. As an exemplary embodiment, when the user requests a schedule of visiting an emergency room at dawn, the fleet system may determine the use of a particular moving object as emergency driving, even when the user does not provide any information. In addition, the fleet system may determine the use of a particular moving object as emergency driving by considering a user's characteristics (gender, disease, child, pregnancy, etc.), even when the user does not provide any information. Based on the above-description, the fleet system may perform management for moving objects in an environment in which a plurality of moving objects is used by a plurality of users, thereby providing a moving object sharing system.

Figure 7:
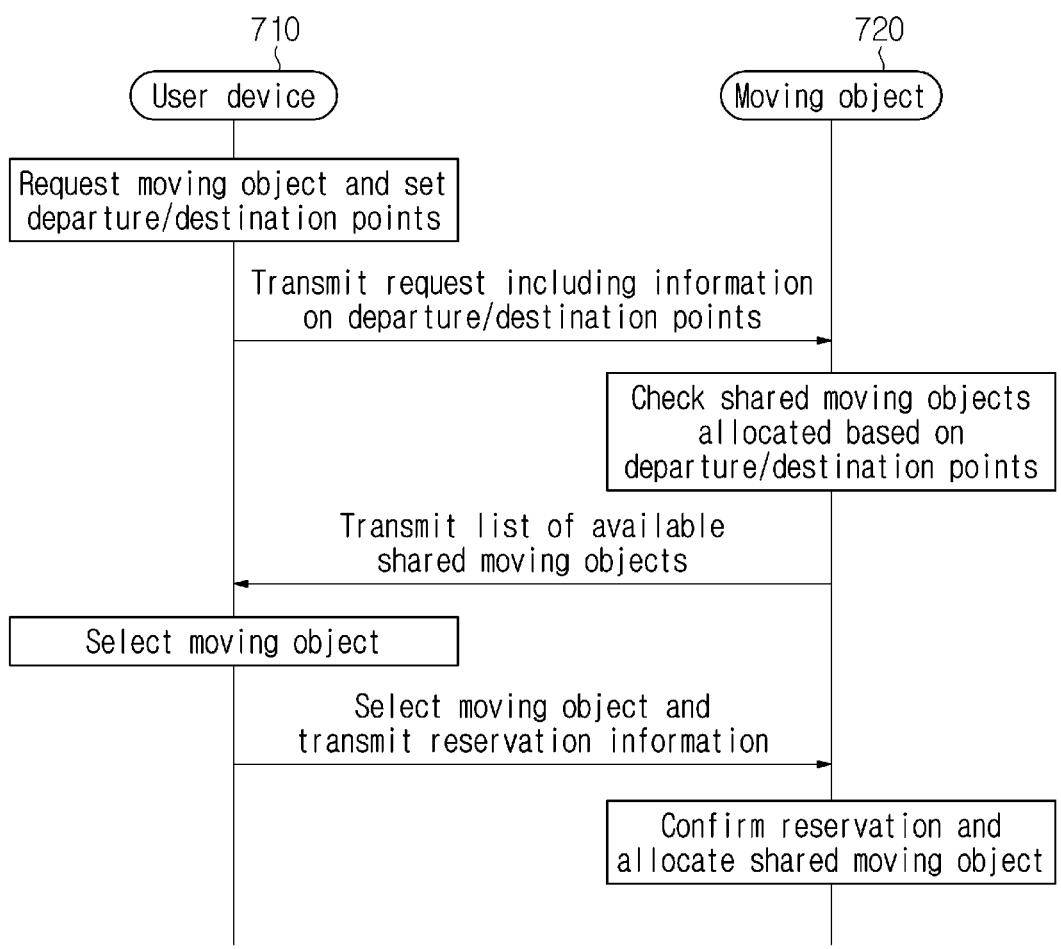
FIG. 7 is a view illustrating a method of making an advance reservation for a moving object in a fleet system, in accordance with an embodiment of the present disclosure.

FIG. 7 is a view illustrating a method of making an advance reservation for a moving object in a fleet system, in accordance with an embodiment of the present disclosure.

Referring to FIG. 7, a fleet system may be managed based on information on a user's previous use. For example, a user device 710 may transmit a request message for using a moving object to a server (or fleet system) 720. Herein, as an exemplary embodiment, the user device 710 may also transmit information on departure point and destination point for using a moving object to the server 720. In addition, as an exemplary embodiment, the user device 710 may start and end the use of a moving object at the same point and may transmit information on use time to the server 720. Herein, the server 720 may check an available moving object based on information received from the user device 710. Then, the server 720 may transmit a list of available shared moving objects to the user device 710. That is, the server 720 may provide a list of available shared moving objects to the user device 710 by considering specific time and specific departure/destination points selected by the user device 710. Then, the user device 710 may select a moving object based on the received list of shared moving objects and may transmit reservation information for using the selected moving object to the server 720. Then, the server 720 may confirm the reservation information and allocate a shared moving object to the user device 710, thereby enabling the moving object to be used at the above-described time. In addition, as an exemplary embodiment, concerning the advance reservation information described above, the advance reservation may be made a predetermined time prior to the moving object use time. For a concrete example, the fleet system may receive reservation information based on the operation of FIG. 7 24 hours prior to the moving object use time. The present disclosure is not limited to the above-described embodiment. On the other hand, as an exemplary embodiment, when the fleet system receives reservation information after a predetermined time or use request information for immediate use, the fleet system may check an extra moving object by checking moving objects that are in use/available. Herein, only when the fleet system confirms that there is an extra moving object by checking moving objects that are in use/available, the fleet system may allocate the moving object based on the above-described reservation information and the use request information for immediate use. That is, the fleet system may use advance reservation information to efficiently manage a plurality of moving objects for a plurality of users. When there is exceptionally an extra moving object, the fleet system may allocate the moving object at an exceptional request, thereby enhancing the efficiency of managing moving objects.

Herein, the fleet system may keep communicating with moving objects in order to establish an efficient advance reservation system. In this case, a moving object may constantly provide a fleet system with at least one of user information, driving information, or reservation information by using an identification device or a communication module.

Figure 8:
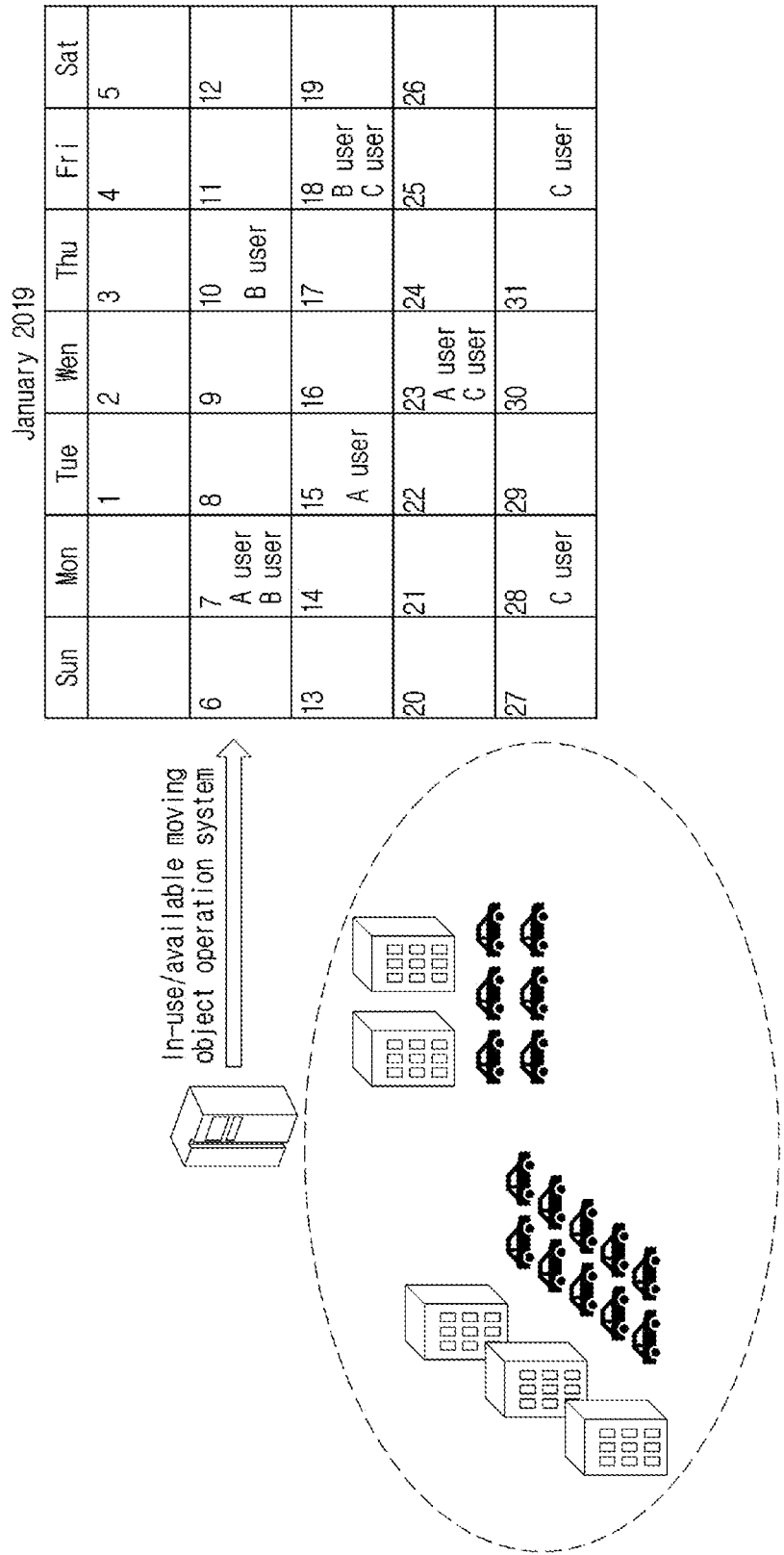
FIG. 8 is a view illustrating a method of operating a fleet system in accordance with an embodiment of the present disclosure.

FIG. 8 is a view illustrating a method of operating a fleet system in accordance with an embodiment of the present disclosure.

Based on the foregoing description, a fleet system may manage an in-use/available moving object operation system. For example, the fleet system may transmit information on the above-described system to a user device registered in the fleet system. In addition, as an exemplary embodiment, the above-described operation system may be managed based on the location information of a designated spot and a shared moving object. As an exemplary embodiment, the fleet system may manage information on the use of a shared moving object, as described above. However, the number of shared moving objects provided by the fleet system may be limited, and a user using a moving object may set different usage start and usage end points of using the moving object. Accordingly, when the fleet system provides an in-use/available moving object operation system, the fleet system may manage the operation system based on use time, an end point and another user's use start point. For example, when a user uses a moving object to travel from the designated spot A to the designated spot B and the use end time is 10 AM, a fleet system may increase the number of available moving objects in the designated spot B at 10 AM. Herein, as an exemplary embodiment, the fleet system may obtain the above-described reservation information from the user device in real time. Accordingly, the fleet system may update the in-use/available moving object operation system in real time based on user reservation information, thereby enabling moving objects to be shared. Herein, as an exemplary embodiment, when the fleet system updates the in-use/available moving object operation system by reflecting reservation information that is obtained in real time as described above, the fleet system may periodically confirm the status information of moving objects. For example, when it is impossible to use a moving object based on the status information of the moving object, a fleet system may update an in-use/available moving object operation system based on the unavailability information. On the other hand, when the status of a moving object is changed to availability status based on a repair of the moving object, the fleet system may update the in-use/available moving object operation system accordingly. That is, the fleet system may be operated by being updated in real time based on user reservation information and moving object status information.

Figure 9:
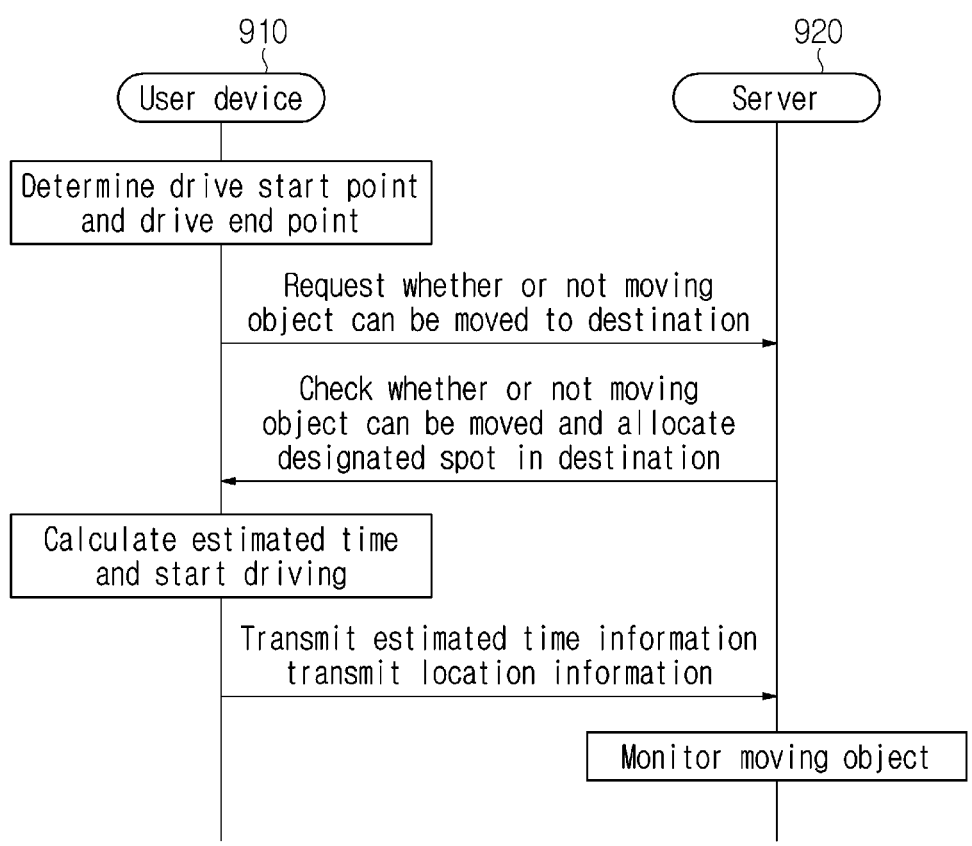
FIG. 9 is a view illustrating a method of monitoring a moving object in a fleet system in accordance with an embodiment of the present disclosure.

FIG. 9 is a view illustrating a method of monitoring a moving object in a fleet system in accordance with an embodiment of the present disclosure.

As another example, a user may transmit not reservation information but a request for immediately using a moving object to a server. In particular, a fleet system may be basically operated and managed based on reservation information. However, as an exemplary embodiment, it is worth considering a case in which a moving object is requested with no user reservation registered in the fleet system. Herein, as an exemplary embodiment, since there should be no change in advance reservation information set by the fleet system, only a extra moving object among moving objects may be an object of immediate use, as described above.

Herein, as an exemplary embodiment, referring to FIG. 9, a user device 910 may determine an operation start point and an operation end point. In other words, the user may input information for using a moving object provided by the fleet system through the user device 910. Herein, the user device 910 may transmit a request message to a server 920 for confirming whether or not the user may travel to the destination through a shared moving object. Herein, the server (or fleet system) 920 may check availability and allocate a designated spot in the destination based on the above-described reservation system. That is, the server 920 may determine whether or not there is a spare moving object based on advance reservation information, and it may be determined whether or not the spare moving object is available for the above-described immediate request. Meanwhile, as an exemplary embodiment, the server 920 may update an in-use/available moving object operation system based on use information after a moving object is allocated. As an exemplary embodiment, the user device 910 may calculate an estimated time of a moving object and transmit the corresponding information to the server 920. As an exemplary embodiment, the server 920 may increase the number of available moving objects in a designated destination spot at moving object use end time. In other words, the fleet system may manage an in-use/available moving object in real time based on advance reservation and may further reflect moving object use information based on an immediate request. Thus, the fleet system may enable a plurality of moving objects to be efficiently allocated and used.

Figure 10:
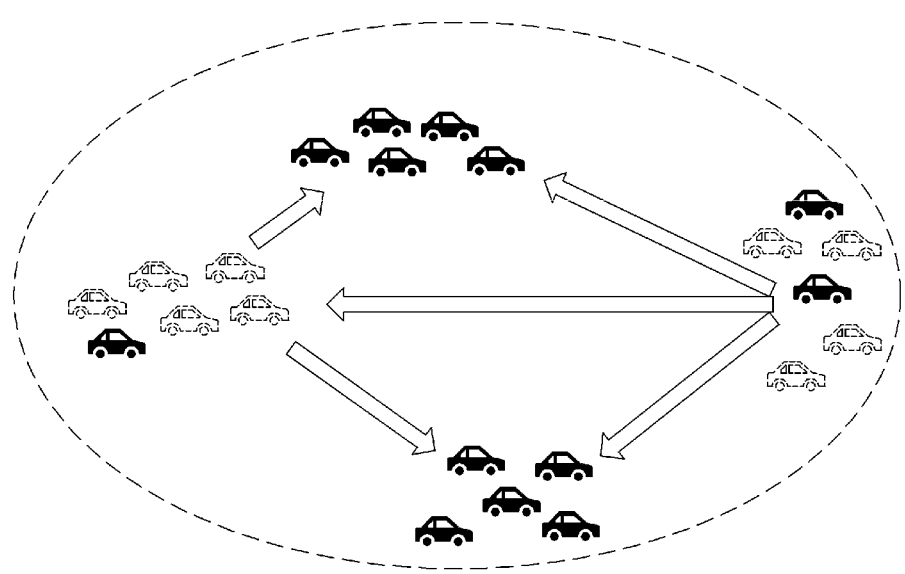
FIG. 10 is a view illustrating a method of distributing moving objects in a fleet system in accordance with an embodiment of the present disclosure.

FIG. 10 is a view illustrating a method of distributing moving objects in a fleet system in accordance with an embodiment of the present disclosure.

In addition, as an exemplary embodiment, a plurality of moving objects may be used in a fleet system, and there may also be a plurality of users. Herein, as an exemplary embodiment, moving objects used by the fleet system may not be dispersedly placed. In particular, the demand for moving objects registered in the fleet system may be concentrated during the morning rush hour. Based on this, the moving objects may be dispersed. Accordingly, a user who wants to use a moving object during the morning rush hour may not be able to use the moving object due to the lack of moving objects. In addition, as an exemplary embodiment, since a departure point and a destination point for using a moving object may be different, the destination point may be congested with a plurality of shared moving objects. Thus, the use of a moving object may be disrupted.

Figure 11:
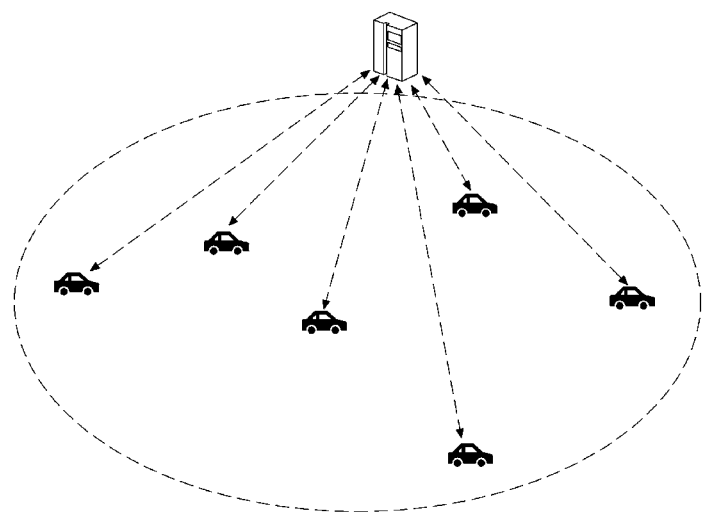
FIG. 11 is a view illustrating a method of managing a moving object in a fleet system in accordance with an embodiment of the present disclosure.

FIG. 11 is a view illustrating a method of managing a moving object in a fleet system in accordance with an embodiment of the present disclosure.

In consideration of the foregoing description, a fleet system may perform continuous monitoring for a moving object. For example, a moving object may transmit a message to the fleet system on a regular period. Herein, the message transmitted by the moving object may include the location information of the moving object and the status information of the moving object. As an exemplary embodiment, the fleet system may periodically identify the locations of the moving objects based on information received from a plurality of moving objects, and may check the status of the moving objects in real time. Meanwhile, as an exemplary embodiment, a message transmission period on which a moving object is in use may be different from a message transmission period on which the moving object is not in use. As an exemplary embodiment, when the moving object is in use, the message transmission period may be short since the location and status of the moving object need to be frequently checked. On the other hand, when the moving object is not in use and is parked in a designated spot, the message transmission period may become longer since the location is fixed and the status needs not be frequently checked. That is, the message transmission period may be differently set based on whether the moving object is in use or not. As another example, when an event in a moving object is triggered, the moving object may transmit a message to a fleet system. For example, the event may be an accident or a collision occurring to the moving object. In other words, when the moving object has an abnormal event, the moving object may transmit a message including the corresponding information to the fleet system so that the moving object may be managed.

Figure 12:
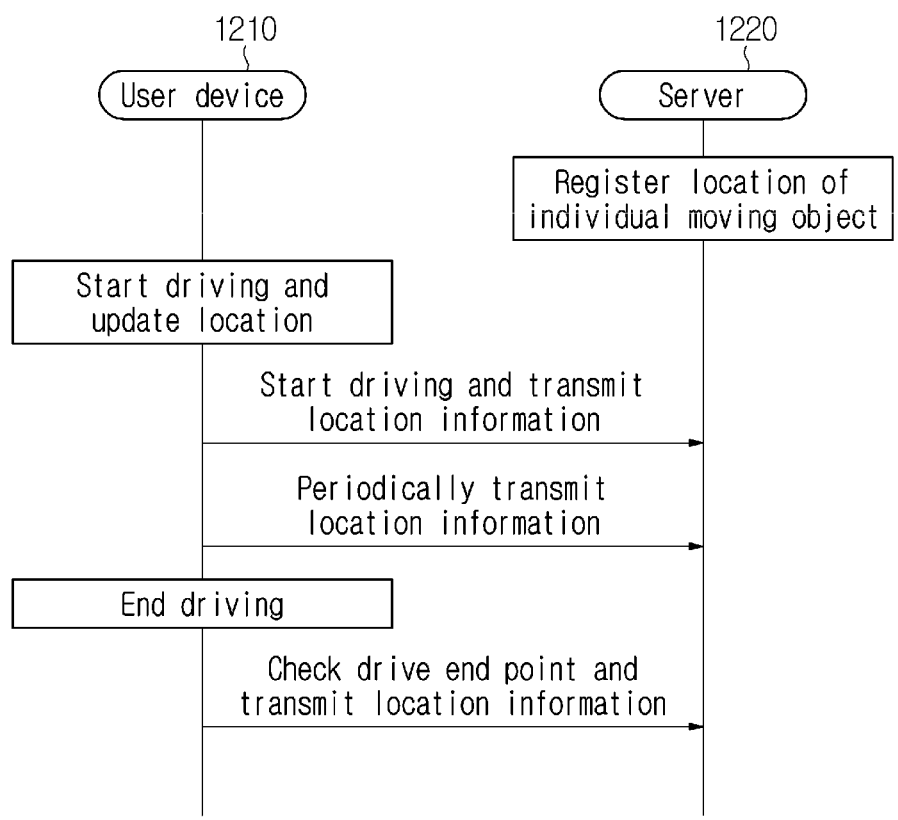
FIG. 12 is a view illustrating a method of managing the location information of a moving object in a fleet system in accordance with an embodiment of the present disclosure.

FIG. 12 is a view illustrating a method of managing the location information of a moving object in a fleet system in accordance with an embodiment of the present disclosure.

As a more concrete example, referring to FIG. 12, it is possible to consider a case in which a moving object 1210 is used by a user. Herein, a server 1220 may register a location of the moving object. For example, as described above, the server 1220 may receive a message including the location information and status information of the moving object from the moving object 1210. Based on this, the location of the moving object 1210 may be registered. Then, the moving object 1210 may be operated by being controlled by the user. Herein, the location of the moving object 1210 may be updated, and the moving object 1210 may transmit a message including the location information and status information to the server 1220 on a regular period. For example, the period may be shorter than when the moving object 1210 is stopped, as described above.

Next, it is possible to consider a case in which the moving object 1210 ends operation. As an exemplary embodiment, the moving object 1210 may detect the end of use by the user. Herein, the moving object 1210 may transmit a message including location information and other information indicating the end of operation of the moving object to the server 1220, even before the above-described period is arrived. In other words, the moving object 1210 may transmit information on the end of operation to the server. Herein, as an exemplary embodiment, a period on which the moving object 1210 transmits a message may be changed based on the above-described point. In other words, a message transmission period may become longer. Thus, the server 1220 may manage the moving object 1210.

Figure 13:
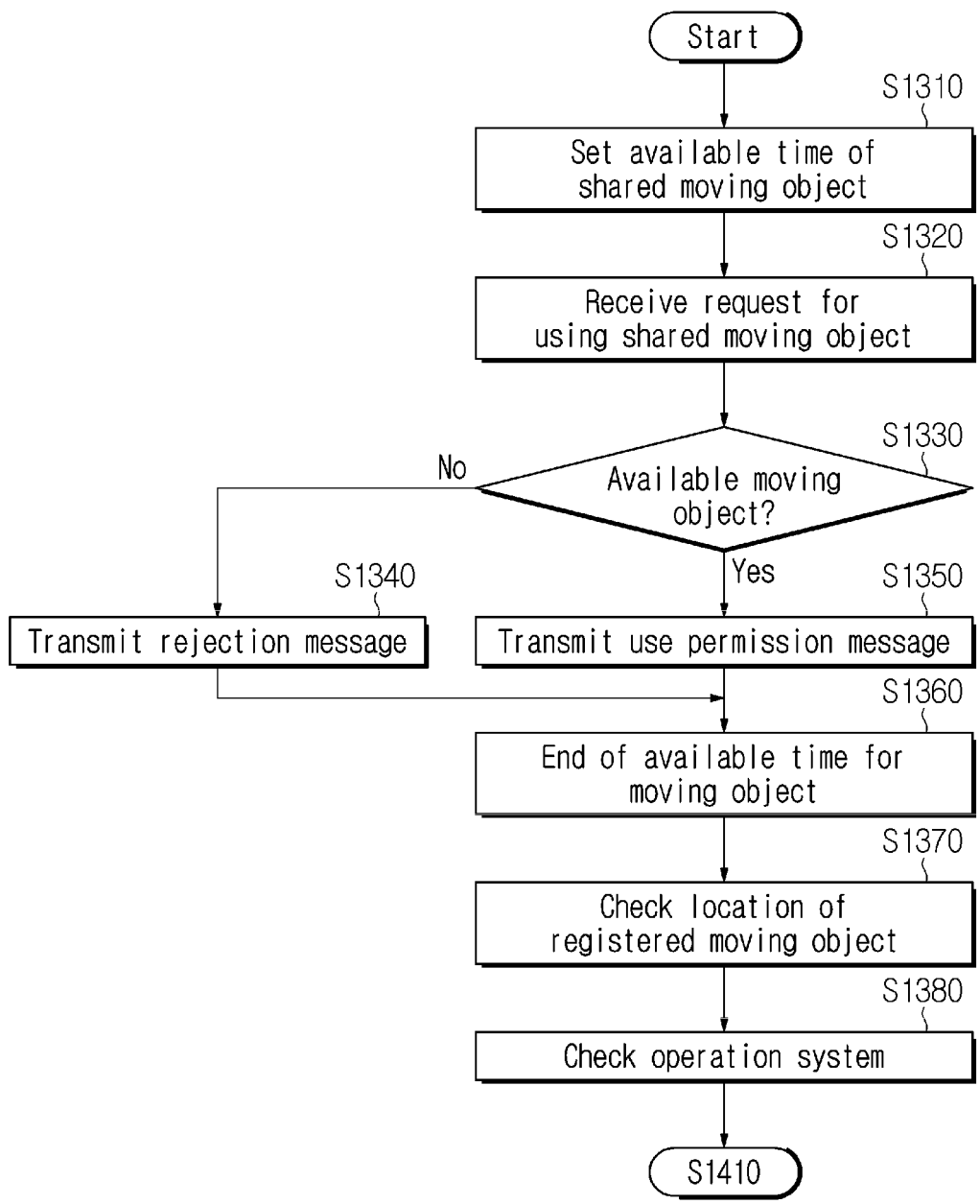
FIG. 13 is a view illustrating a method in which a moving object moves based on an unmanned moving system in a fleet system in accordance with an embodiment of the present disclosure.
Figure 14:
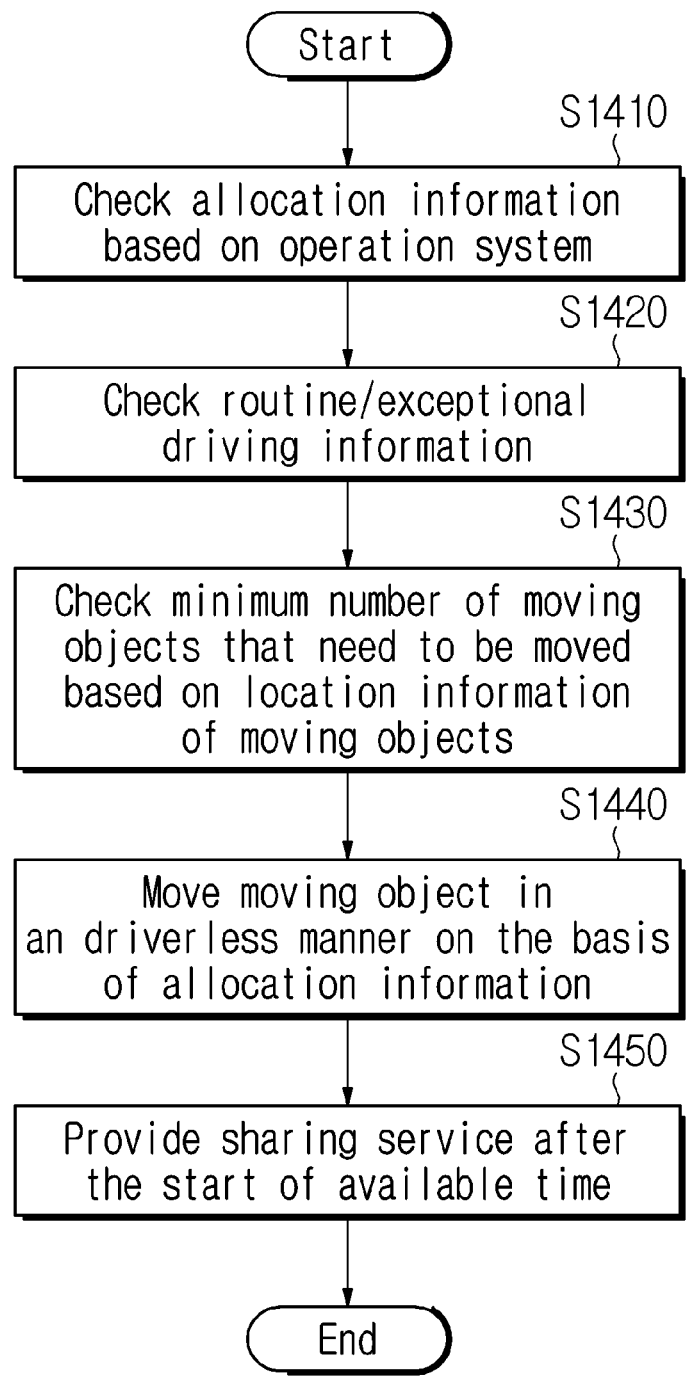
FIG. 14 is a flowchart illustrating a method of operating a fleet system in accordance with an embodiment of the present disclosure.

FIG. 13 and FIG. 14 are views illustrating a method where a moving object moves based on an unmanned movement system in a fleet system, in accordance with an embodiment of the present disclosure.

In addition, as an exemplary embodiment, a fleet system may manage a moving object by setting an available time. For example, an available time of the moving object may be set for each moving object. In addition, as an exemplary embodiment, the available time of the moving object may be set for moving objects that are set as a group. In addition, as an exemplary embodiment, the available time may be set in a fleet system itself and may be applied to all the moving objects simultaneously. The present disclosure is not limited to the above-described embodiment. For example, referring to FIG. 13, the available time may be set for a shared moving object (S1310). Herein, as an exemplary embodiment, the available time may mean a time in which a moving object is used by a user. As described above, the available time may be set either individually or based on groups. Herein, as an exemplary embodiment, the fleet system may receive an application for using a moving object (S1320). For example, a moving object set as an available time among moving objects may be a target of the application, and other moving objects that are not set as the available time may not be the target of the application. In other words, the fleet system may receive the application based on an available moving object. In addition, as described above, the use of a moving object may be applied either by an advance reservation or by an immediate application. The present disclosure is not limited to the above-described embodiment. Herein, when there is no available moving object (S1330), the fleet system may transmit a rejection message (S1340). On the other hand, when there is an available moving object (S1330), the fleet system may transmit a use permission message (S1350). Then, the fleet system may check whether or not a moving object is available by considering a moving object available time. For example, when moving object availability end time precedes estimated moving object use end time, the fleet system may not allow the moving object to be used. In other words, the fleet system may provide a sharing service by considering a moving object available time. Then, the available time of the moving object may end (S1360). In other words, the moving object may not be a shared moving object provided by the fleet system. Herein, the fleet system may check the location information of a moving object, of which the available time ends (S1370). In addition, as an exemplary embodiment, the fleet system may further obtain the location information and status information of the moving object, of which the available time ends, and may check the status of the moving object, of which the available time ends. In other words, a time in which a moving object is available may be set by considering the moving object management in a fleet system. Herein, the fleet system may transmit information on a moving object, of which the available time ends, to the above-described in-use/available operation system (S1380). In other words, the fleet system may transmit information on the moving object, of which the available time ends, to the operation system.

Herein, as an exemplary embodiment, concerning the operation of an operation system, referring to FIG. 14, a fleet system may check the use and allocation information of a moving object based on the operation system (S1410). For example, as described above, the fleet system may check the use information of a reserved moving object. Herein, the fleet system may determine routine driving and exceptional driving for the reserved moving object and may also check the allocation information for the use of the moving object (S1420). In other words, the fleet system may confirm whether or not the moving object is in a use location based on the driving of the user. Next, the fleet system may check the minimum number of necessary moving objects related to the use of moving objects based on moving object location information (S1430). As an exemplary embodiment, the fleet system may check the number of necessary moving objects in each designated spot by considering a use time. As an exemplary embodiment, the fleet system may check the number of moving objects necessary for morning commute in a particular designated spot early in the morning. Here, for example, the fleet system may move a moving object in an unmanned manner based on moving object allocation information (S1440). As an exemplary embodiment, the moving object may be moved in an unmanned manner based on designated spot information since the moving object may be operated based on a designated spot as described above. In addition, as an exemplary embodiment, the moving object may be moved from a designated spot to another designated spot by using other information. Then, a sharing service may be provided after available time of the moving object (S1450). That is, a moving object for operating a fleet system may be secured in the basis of the foregoing description.

As another example, when setting the above-described available time, a fleet system may consider the inspection time of a moving object. In other words, even when there is no additional reservation for the moving object, if an inspection time for maintaining and managing the moving object is required, the available time of the moving object may be limited.

As another example, when a moving object is not used by any user device and a fleet system determines that the moving object needs to be inspected, the fleet system may move the moving object to a predesignated spot in an unmanned manner. Herein, the predesignated spot may be a place, in which a moving object is maintained and managed, such as a garage, a car wash and a cleaning service for the interior of a moving object.

As another example, a fleet system may group moving objects managed by the fleet system in units of a certain number. In addition, the fleet system may perform maintenance and management for each group of moving objects. In the above-described example, when the predesignated spot is a garage, a car wash and the like, a designated spot (a garage, a car wash and a cleaning service for the interior of a moving object) for maintaining and managing moving objects may be set for each group of moving objects. In other words, when the maintenance and management for a moving object is necessary, the fleet system may move the moving object to a designated spot of each group in an unmanned manner, thereby enabling the maintenance and management for the moving object. As the maintenance and management for moving objects is performed in each group of moving objects, many moving objects may be maintained and managed in a limited time.

As another example, the fleet system may enable quick maintenance and management when a moving object has an inspection time by placing a support unit for maintaining and managing moving objects in each group of moving objects. As an exemplary embodiment, the support unit may be a maintenance vehicle placed for maintaining and managing moving objects.

Figure 15:
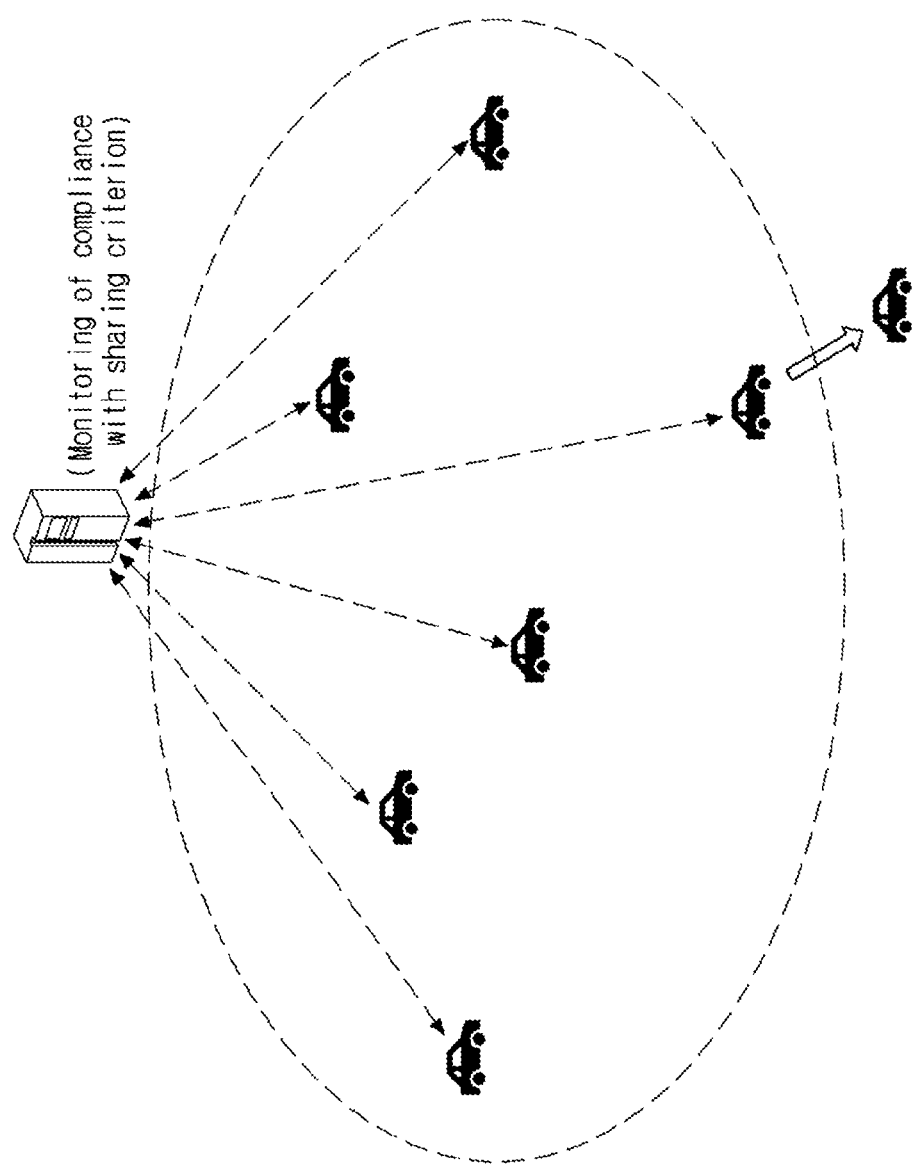
FIG. 15 is a view illustrating a method of monitoring a moving object in a fleet system in accordance with an embodiment of the present disclosure.

FIG. 15 is a view illustrating a method of monitoring a moving object in a fleet system in accordance with an embodiment of the present disclosure.

As another example, as described above, when a fleet system provides a moving object sharing service, the fleet system may monitor a moving object. For example, a moving object may periodically transmit location information and status information to a fleet system, as described above. Based on this, a moving object may be monitored. Herein, as an exemplary embodiment, a fleet system may set a criterion for a shared moving object. As an exemplary embodiment, the criterion may be a temporal criterion and a spatial criterion. In addition, as an exemplary embodiment, the criterion may be a criterion for using a moving object. The present disclosure is not limited to the above-described embodiment.

Herein, based on information received from each moving object, the fleet system may determine whether or not a moving object violates the sharing criterion. As an exemplary embodiment, the fleet system may check whether or not a moving object is used for over a predetermined time. In addition, as an exemplary embodiment, the fleet system may check whether or not a moving object goes outside of a preset area. In addition, as an exemplary embodiment, the fleet system may check whether or not a moving object is used against a predetermined condition. The present disclosure is not limited to the above-described embodiment.

Figure 16:
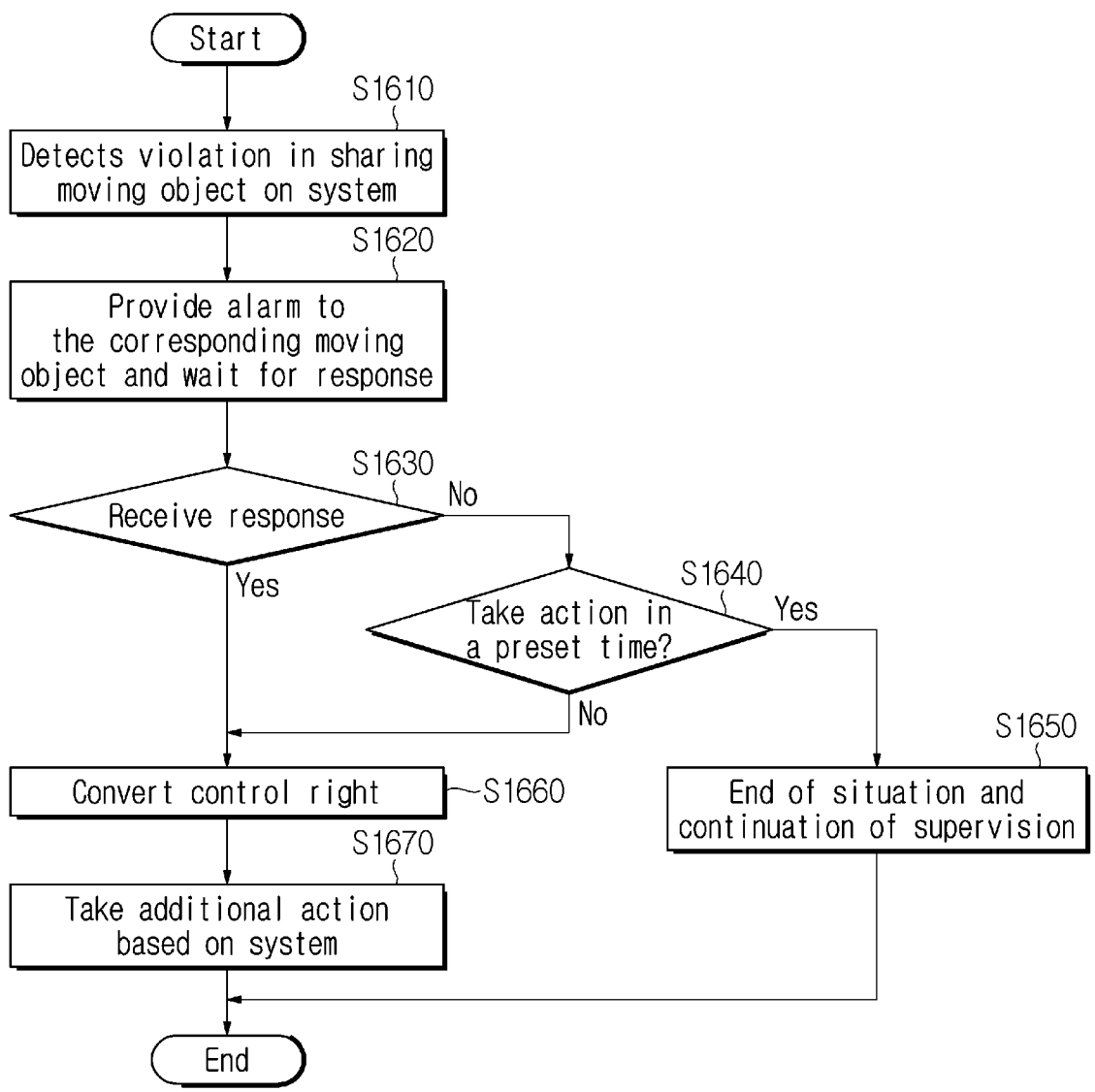
FIG. 16 is a flowchart illustrating a method of monitoring a moving object in a fleet system in accordance with an embodiment of the present disclosure.

FIG. 16 is a flowchart illustrating a method of monitoring a moving object in a fleet system in accordance with an embodiment of the present disclosure.

Referring to FIG. 16 for a more concrete example, a fleet system may check whether or not a moving object violates a sharing criterion (S1610). Herein, as an exemplary embodiment, the fleet system may receive location information and status information from a moving object as described above, and thus may determine whether or not the sharing criterion is violated. When the moving object violates the sharing criterion, the fleet system may transmit alarm information to the moving object (S1620). That is, the fleet system may transmit information that the moving object violates the sharing criterion. Herein, as an exemplary embodiment, the fleet system may receive a response to the alarm (S1630). For example, when the fleet system receives the alarm, the fleet system may determine whether or not a moving object will implement a necessary action within a designated time (S1640). In other words, a preset timer may start in order to cancel the violation of the sharing criterion. Herein, when the moving object is converted to a status in which the moving does not violate the sharing criterion, the fleet system may finish the violation situation and perform management and supervision (S1650). As an exemplary embodiment, the fleet system may continuously receive status information and location information from a moving object and thus may determine whether or not the sharing criterion is violated. On the other hand, it may consider a case in which the fleet system does not change the violation state of the sharing criterion until a preset timer terminates. In addition, for example, it may consider a case where a fleet system does not receive a response message for the above-described alarm information. In this case, the fleet system may convert a control right for the moving object (S1660). For example, the moving object may be moved to and stopped in a safe area based on the conversion of a control right. In addition, as an exemplary embodiment, the fleet system may take an additional action based on the conversion of a control right (S1670). For example, the additional action may be transmitting a warning message to a user device using a moving object or operating a system for tracking a moving object. The present disclosure is not limited to the above-described embodiment.

For example, a fleet system may impose an additional restriction action on a user who violates a sharing criterion. A restriction action of a fleet system may be at least one of mileage deduction for such a user, a restriction on additional reservation for the user, prohibition of using the fleet system for a predetermined period, inapplicability of the routine driving and exceptional driving, or a lower place in the order of priority.

As another example, when a user ends the use of a moving object without moving it to a designated destination spot that is initially set, the fleet system may determine that the user has violated the sharing criterion. In this case, the fleet system may transmit to the user a message that the moving object should be moved to the designated destination spot. In addition, the fleet system may also prohibit the use of an additional fleet system until the user has moved the moving object to the designated destination spot.

Figure 17:
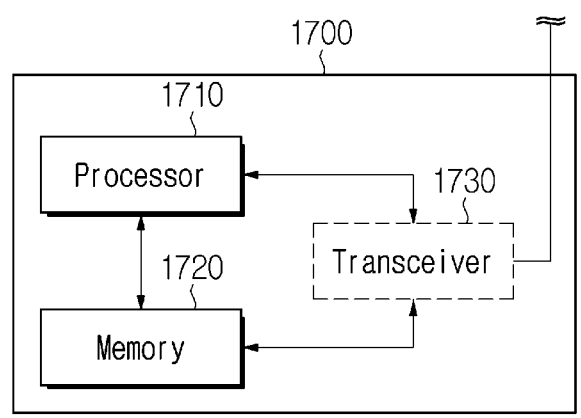
FIG. 17 is a view illustrating a configuration of an apparatus according to an embodiment of the present disclosure.

FIG. 17 is a view illustrating an apparatus configuration according to an embodiment of the present disclosure.

Referring to FIG. 17, the apparatus may include at least one of the moving object, a device, a server, or an RSU. In other words, the apparatus may communicate and work with other device. The present disclosure is not limited to the above-described embodiment. For example, an apparatus 1700 may include one of a processor 1710, a memory 1720, or a transceiver 1730 for the above-described operation. In other words, the apparatus may include a necessary configuration for communicating with another apparatus. In addition, as an exemplary embodiment, the apparatus may include another configuration apart from the above-described configuration. In other words, the apparatus may have a configuration, which includes the above-described apparatus for communicating with other device but is not limited thereto, and may be operated based on what is described above.

While the example methods of the present disclosure described above are represented as a series of operations for clarity of description, it is not intended to limit the order in which the steps are performed, and each step may be performed simultaneously or in a different order as desired. In order to implement the method according to the present disclosure, the illustrated step may further include other steps, may include remaining steps except for some steps, or may include other additional steps except for some steps.

The various forms of the present disclosure are not an exhaustive list of all possible combinations, and are intended to describe representative aspects of the present disclosure, and the matters described in the various forms may be applied independently or in combination of two or more.

In addition, various forms of the present disclosure may be implemented by hardware, firmware, software, or a combination thereof. The hardware may be implemented by one or more of application specific Integrated Circuits (ASICs), Digital Signal Processors (DSPs), Digital Signal Processing Devices (DSPDs), Programmable Logic Devices (PLDs), Field Programmable Gate Arrays (FPGAs), a general processor, a controller, a microcontroller, a microprocessor, and the like.

It is intended that the scope of the disclosure includes software or machine-executable instructions (e.g., an operating system, an application, firmware, a program, etc.) that causes an operation in accordance with various forms to be executed on an apparatus or a computer, and non-transitory computer-readable media that are executable on a device or computer in which such software or instructions, and the like are stored.

What is claimed is:

1. A method of managing a moving object in a fleet system, the method comprising:
   transmitting, by a user device, a moving object request message comprising a departure point and use time information to a server;
   receiving, by the user device, a list of available moving objects based on the moving object request message from the server;
   selecting, by the user device, a moving object from the list of available moving objects;
   transmitting, by the user device, reservation information based on moving object selection information and the use time information to the server; and
   allocating the moving object to the user device based on the reservation information,
   wherein the server updates allocation and placement information on a plurality of moving objects based on reservation information on a plurality of user devices,
   wherein the server determines a routine driving regarding a case in which a user periodically uses the moving object or exceptional driving regarding a case in which the user irregularly uses the moving object, and the routine driving is determined based on information on the routine driving, and the information on the routine driving includes information on a usage start location where the user starts using the moving object, information on a usage end location where the user ends the use of the moving object and information on use time,
   wherein the server allocates a moving object by prioritizing reservation information of a user device indicated by the routine driving over reservation information of a user device indicated by the exceptional driving when the server updates the allocation and placement information on the plurality of moving objects based on the reservation information on the plurality of user devices,
   wherein the moving object periodically transmits a message including location information of the moving object and status information of the moving object to the server,
   wherein the server determines whether or not a use of the user's moving object violates a sharing criterion, which is required of the user for using the moving object, based on the message transmitted by the moving object, and the server transmits a warning message to the moving object when the server determines that the moving object violates the sharing criterion,
   wherein the server changes a control right for the moving object to give the control right to the moving object, when the server does not receive a response to the warning message or a violation of the sharing criterion is not released within a predetermined time,
   wherein, in response to changing the control right for the moving object, the server moves the moving object to a safe area and stops the moving object in the safe area,
   wherein a destination point along with the departure point are set based on a designated spot, and the designated spot is a place that is predetermined by the server,
   wherein a plurality of the designated spots are predetermined in the server, and an available moving object is managed in each of the designated spots,
   wherein the server manages the available moving object by considering at least one of a number of parking spaces at each of the designated spots or a number of available moving objects at each of the designated spots, and
   wherein the server transmits information on a designated spot recommended for departure different from a spot of the departure point to the user device when there is no moving object available in the spot of the departure point.

2. The method of claim 1,
   wherein the server transmits information on a designated spot recommended for destination different from a spot of the destination point to the user device or the moving object when there is no parking space available in the spot of the destination point.

3. The method of claim 1,
   wherein the server moves a moving object of a different spot from a spot of the departure point to the spot of the departure point in a driverless manner when a number of available moving objects in the spot of the departure point is equal to or less than a predetermined value.

4. The method of claim 1,
   wherein the server moves a moving object of a different spot from a spot of the destination point to the spot of the destination point in a driverless manner when a number of available parking spaces in the spot of the destination point is equal to or greater than a predetermined value.

5. The method of claim 1,
   wherein the server increases a number of available moving objects of a second designated spot at a first point of time when the departure point is a first designated spot, the destination point is the second designated spot and an end time of use is the first point of time based on the use time information.

6. The method of claim 1,
   wherein the moving object request message, which is transmitted to the server by the user device, comprises use type information on the moving object, and the use type information on the moving object is one of routine driving or exceptional driving.

7. The method of claim 1,
   wherein the use time information comprises at least one of use start time information or use end time information for a moving object selected by the user device.

8. The method of claim 1,
   wherein an available time, in which the moving object is capable of being shared, is set in the moving object, and the moving object in the available status is allocated to the user device by the server based on the available time.

9. The method of claim 1,
   wherein the server groups the plurality of moving objects under management by a certain number, and the server performs maintenance and management for each moving object in each group of the moving objects.

10. The method of claim 1, wherein:
    when the moving object is used, the moving object transmits the message to the server based on a first period, based on the user device, and
    when the moving object is not used, the moving object transmits the message to the server based on a second period, and the first period is shorter than the second period.

11. A fleet system for managing a moving object in a fleet system, the server comprising:
    a transceiver for transmitting and receiving a signal; and
    a processor for controlling the transceiver,
    wherein the processor receives a moving object request message comprising a departure point and use time information from a user device, transmits a list of available moving objects based on the moving object request message to the user device, receives reservation information based on moving object selection information and use time information from the user device, and allocates the moving object to the user device based on the reservation information, and wherein, the fleet system updates allocation and placement information on a plurality of moving objects based on reservation information on a plurality of user devices, wherein the processor determines a routine driving regarding a case in which a user periodically uses the moving object or exceptional driving regarding a case in which the user irregularly uses the moving object, and the routine driving is determined based on information on the routine driving, and the information on the routine driving includes information on a usage start location where the user starts using the moving object, information on a usage end location where the user ends the use of the moving object and information on use time, wherein the processor allocates a moving object by prioritizing reservation information of a user device indicated by the routine driving over reservation information of a user device indicated by the exceptional driving when the fleet system updates the allocation and placement information on the plurality of moving objects based on the reservation information on the plurality of user devices, wherein the moving object periodically transmits a message including location information of the moving object and status information of the moving object to the server, wherein the processor determines whether or not a use of the user's moving object violates a sharing criterion, which is required of the user for using the moving object, based on the message transmitted by the moving object, and the processor transmits a warning message to the moving object when the processor determines that the moving object violates the sharing criterion, wherein the processor changes a control right for the moving object to give the control right to the moving object, when the processor does not receive a response to the warning message or a violation of the sharing criterion is not released within a predetermined time, wherein, in response to changing the control right for the moving object, the processor moves the moving object to a safe area and stops the moving object in the safe area, wherein a destination point along with the departure point are set based on a designated spot, and the designated spot is a place that is predetermined by the processor, wherein a plurality of the designated spots are predetermined in the processor, and an available moving object is managed in each of the designated spots, wherein the processor manages the available moving object by considering at least one of a number of parking spaces at each of the designated spots or a number of available moving objects at each of the designated spots, and wherein the processor transmits information on a designated spot recommended for departure different from a spot of the departure point to the user device when there is no moving object available in the spot of the departure point.

12. A fleet system for providing a moving object sharing service, the system comprising:
a managing device configured to manage the fleet system;
a plurality of user devices registered in the fleet system; and
a plurality of moving objects registered in the fleet system,
wherein at least one user device among the plurality of user devices transmits a moving object request message comprising a departure point and use time information to the managing device, receives a list of available moving objects based on the moving object request message from the managing device, selects a moving object from the list of available moving objects, and transmits reservation information based on moving object selection information and the use time information to the managing device,
wherein the managing device allocates the moving object to the user device based on the reservation information and updates allocation and placement information on the plurality of moving objects based on the reservation information on the plurality of user devices,
wherein the managing device determines a routine driving regarding a case in which a user periodically uses the moving object or exceptional driving regarding a case in which the user irregularly uses the moving object, and the routine driving is determined based on information on the routine driving, and the information on the routine driving includes information on a usage start location where the user starts using the moving object, information on a usage end location where the user ends the use of the moving object and information on use time, and
wherein the managing device allocates a moving object by prioritizing reservation information of a user device indicated by the routine driving over reservation information of a user device indicated by the exceptional driving when the managing device updates the allocation and placement information on the plurality of moving objects based on the reservation information on the plurality of user devices,
wherein the moving object periodically transmits a message including location information of the moving object and status information of the moving object to the managing device,
wherein the managing device determines whether or not a use of the user's moving object violates a sharing criterion, which is required of the user for using the moving object, based on the message transmitted by the moving object, and the managing device transmits a warning message to the moving object when the managing device determines that the moving object violates the sharing criterion, and
wherein the managing device changes a control right for the moving object to give the control right to the moving object, when the managing device does not receive a response to the warning message or a violation of the sharing criterion is not released within a predetermined time,
wherein, in response to changing the control right for the moving object, the managing device moves the moving object to a safe area and stops the moving object in the safe area,
wherein a destination point along with the departure point are set based on a designated spot, and the designated spot is a place that is predetermined by the managing device, wherein a plurality of the designated spots are predetermined in the managing device, and an available moving object is managed in each of the designated spots, wherein the managing device manages the available moving object by considering at least one of a number of parking spaces at each of the designated spots or a number of available moving objects at each of the designated spots, and wherein the managing device transmits information on a designated spot recommended for departure different from a spot of the departure point to the user device when there is no moving object available in the spot of the departure point.

* * * * *